US007269286B2

United States Patent
Wenzel et al.

(10) Patent No.: US 7,269,286 B2
(45) Date of Patent: *Sep. 11, 2007

(54) DISCRETE CURVE SYMMETRY DETECTION

(75) Inventors: Lothar Wenzel, Round Rock, TX (US); Mark S. Williams, Austin, TX (US)

(73) Assignee: National Instruments Corporation, Austin, TX (US)

( * ) Notice: Subject to any disclaimer, the term of this patent is extended or adjusted under 35 U.S.C. 154(b) by 687 days.

This patent is subject to a terminal disclaimer.

(21) Appl. No.: 10/455,141

(22) Filed: Jun. 5, 2003

(65) Prior Publication Data

US 2004/0247181 A1 Dec. 9, 2004

(51) Int. Cl.
- G06K 9/62 (2006.01)
- G06K 9/64 (2006.01)
- G06K 9/68 (2006.01)
- G06K 9/46 (2006.01)

(52) U.S. Cl. .................. 382/203; 382/209; 382/216; 382/217

(58) Field of Classification Search ............... 382/199, 382/203, 209, 217, 216
See application file for complete search history.

(56) References Cited

U.S. PATENT DOCUMENTS

| 5,933,523 A | 8/1999 | Drisko et al. |
| 6,035,066 A | 3/2000 | Michael |
| 6,240,218 B1 | 5/2001 | Michael et al. |
| 6,324,299 B1 | 11/2001 | Sarachik et al. |
| 6,381,366 B1 | 4/2002 | Taycher et al. |
| 6,411,734 B1 | 6/2002 | Bachelder et al. |
| 6,421,458 B2 | 7/2002 | Michael et al. |
| 6,633,686 B1 * | 10/2003 | Bakircioglu et al. ........ 382/294 |
| 6,650,778 B1 * | 11/2003 | Matsugu et al. ............ 382/209 |
| 2002/0140700 A1 | 10/2002 | Wenzel et al. |
| 2003/0007690 A1 | 1/2003 | Rajagopal et al. |

(Continued)

OTHER PUBLICATIONS

"Numerical Recipes in Fortran 77: The Art of Scientific Computing" (ISBN 0-521-43064-X), Cambridge University Press, pp. 299-306 Copyright 1986-1992.

(Continued)

*Primary Examiner*—Bhavesh M. Mehta
*Assistant Examiner*—John B Strege
(74) *Attorney, Agent, or Firm*—Meyertons Hood Kivlin Kowert & Goetzel, P.C.; Jeffrey C. Hood; Mark S. Williams

(57) ABSTRACT

System and method for detecting symmetries of discrete curves. A mapping operator is applied to a first discrete curve to amplify its features, generating a first mapped discrete curve. A correlation of the first mapped discrete curve with each of a plurality of rotationally shifted versions of a second mapped discrete curve is computed, generating a corresponding plurality of correlation values. A minimum period of the two curves is determined based on the correlation values, and, based on the minimum period, a symmetry group (SG) of the two curves is determined and output. If the two curves are the same curve, the SG is the rotational SG of the discrete curve. If the second curve is a reflection of the first, the SG is the mutual reflection SG of the first. If the first and second curves are different curves, the SG is the mutual SG of the two curves.

58 Claims, 16 Drawing Sheets

U.S. PATENT DOCUMENTS

2003/0053696 A1 3/2003 Schmidt et al.
2003/0198389 A1 10/2003 Wenzel et al.
2004/0037467 A1 2/2004 Wenzel et al.
2004/0247182 A1 12/2004 Wenzel

OTHER PUBLICATIONS

"State-of-the-Art in Shape Matching", by Remco C. Veltkamp and Michiel Hagedoorn, Utrecht University, Department of Computing Science, The Netherlands, 1999, pp. 1-26.

Loncaric, S. 1998. "A Survey of Shape Analysis Techniques", pp. 1-45, (See note under #5 in coversheet).

Alt, H. and Guibas L.J. Discrete Geometric Shapes: Matching, Interpolation, and Approximation, Dec. 3, 1996, pp. 1-34. (See note under #5 in coversheet).

Bjorn Johansson, "Multiscale Curvature Detection in Computer Vision", Linkoping Studies in Science and Technology Thesis No. 877, Mar. 2001, Chapter 5.

* cited by examiner

PRIOR ART PATTERN MATCHING

PRIOR ART PATTERN MATCHING WITH
CHARACTERIZATION OF THE TEMPLATE IMAGE

| object class | object symmetry | layer 0 | layer 1 | layer 2 |
|---|---|---|---|---|
| A | 4 | $A_0$ | | |
| B | 360 | $B_0$ | | |
| C | 4 | | $C_1,C_2,C_3,C_4$ | $C_5,C_6$ |
| D | 2 | | $D_1,D2$ | |

| object class | object symmetry | layer 0 | layer 1 | layer 2 |
|---|---|---|---|---|
| A | 4 | 4 | | |
| B | 360 | 360 | | |
| C | 4 | | 4 | 2 |
| D | 2 | | 2 | |

DISCRETE CURVE SYMMETRY DETECTION

FIELD OF THE INVENTION

The present invention relates to geometric pattern matching in general, and more particularly to a system and method for detecting symmetries in and among discrete curves.

DESCRIPTION OF THE RELATED ART

In many applications it is necessary or desired to determine the presence of an object of interest in a data set, such as a target image. For example, in many image processing applications it is desirable to find one or more matches of a template image in a larger target image. Exemplary machine vision applications include process monitoring, feedback control, and laboratory automation; image and video compression; and jitter compensation in video cameras, among others. Various characteristics may be used in classifying a location in the target image as a match, including luminance pattern information, color pattern information, and color information.

Additionally, the object of interest in the target data set or image may be transformed relative to the known object information, e.g., in the template data set or image. For example, the object of interest in the target image may be shifted, scaled, rotated, or may have other geometric or topological transformations.

Prior art pattern recognition systems have typically used a template matching technique wherein the stored image or pattern to be located is iteratively compared with various portions of a target image in which it is desired to locate the template. FIG. 1 illustrates the pattern matching problem as known in the prior art. As shown, the pattern matching problem involves a template image, wherein one or more instances of the template image are desired to be located in the target image. The template image and the target image are provided to a pattern matching algorithm which performs the pattern matching. The pattern matching algorithm generally operates to compare the pixels, e.g., the grayscale value associated with the pixels, in the template image, or a selected subset of sample pixels, against each of the possible various locations in the target image.

Typically, the pattern matching algorithm involves comparing the template image, or a subset of sample pixels representing the template image, against locations in the target image on a horizontal pixel column basis and horizontal scan line basis. In other words, the sample pixels representing the template image are compared against a portion of the pixels in the target image, such as by using a 2D correlation, the sample pixels representing the template are then moved down or across a one pixel scan line or one pixel column in the target image, and the pattern matching algorithm is repeated, etc. Thus, the pattern matching algorithm generally involves comparing the template image pixels against all possible locations in the target image in an iterative fashion. The pattern matching may produce the location of the match in the image, the quality of match and possibly the orientation, size and/or scaling of the match.

The template is typically compared with portions of the target image by utilizing a correlation based pattern matching, i.e., using normalized two dimensional correlation (normalized 2D correlation). This 2D correlation is performed by placing the template over the respective portion of the image and performing a complete normalized 2D correlation between the pixels in the template and the pixels in the corresponding portion of the image, using values associated with the pixels, such as grayscale values. This correlation generally produces a correlation value that indicates the degree of correlation or match. For example, the correlation value may range between −1 and +1, wherein +1 indicates a complete match, 0 indicates no match, i.e., that the two images are uncorrelated, and −1 indicates that the two images are anti-correlated, i.e., a complete reversal of a match.

The normalized 2D correlation operation is based on a point-wise multiplication wherein the template is first conceptually placed over a portion of the image, the value associated with each point or pixel of the template is multiplied with the corresponding pixel value in the respective portion of the target image, and the result is summed over the entire template. Also, as noted above, the template image is generally compared with each possible portion of the target image in an iterative fashion. This approach is thus very computationally intensive.

Various optimizations or algorithms have been developed to provide a more efficient pattern matching technique. One prior art technique is to use selected samples or pixels from the template image, referred to as sample pixels, to represent the template image and hence to reduce the number of computations in the correlation.

FIG. 2 illustrates the pattern matching process of the prior art which involves characterization of the template with a reduced number of sample pixels. In this process, a characterization of the template is performed to extract features from the template image. In other words, the template is characterized to represent the template image with a lesser number of points or pixels, referred to as sample pixels, which presumably accurately characterize the template image. The template image is characterized in this fashion because the time required for the pattern matching is generally directly proportional to the number of points or pixels representing the template image which are used in the pattern matching. Thus the template is characterized to reduce the number of samples or pixels which are used in the correlation operation, thereby reducing the amount of computation. Once a lesser number of sample pixels have been generated, these sample pixels are then used in the pattern matching algorithm to locate instances of the template image in the target image.

Another prior art technique for performing pattern matching utilizes hue plane or color information, either alone or in combination with pattern matching. Utilizing color information can often be used to simplify a grayscale pattern matching problem, e.g., due to improved contrast or separation of an object from the background. Also, some applications may utilize color information alone, i.e., not in conjunction with pattern information, to locate target image matches, e.g., for cases when an application depends on the cumulative color information in a region and not how the colors are arranged within the region or the spatial orientation of the region.

In machine vision applications, color is a powerful descriptor that often simplifies object identification and extraction from a scene. Color characterization, location, and comparison is an important part of machine vision and is used in a large class of assembly and packaging inspection applications. Inspection involves verifying that the correct components are present in the correct locations. For example, color information may be used in inspecting printed circuit boards containing a variety of components; including diodes, resistors, integrated circuits, and capacitors. These components are usually placed on a circuit board using automatic equipment, and a machine vision system is useful to verify that all components have been placed in the appropriate positions.

As another example, color information is widely used in the automotive industry to verify the presence of correct components in automotive assemblies. Components in these assemblies are very often multicolored. For example, color characterization may be used to characterize and inspect fuses in junction boxes, i.e., to determine whether all fuses are present and in the correct locations. As another example, it is often necessary to match a fabric in one part of a multi-color automobile interior. A color characterization method may be used to determine which of several fabrics is being used.

Another prior art technique for performing pattern matching is referred to as geometric pattern matching, which may also be referred to as curve matching or shape matching. Geometric pattern matching generally refers to the detection and use of geometric features in an image, such as boundaries, edges, lines, etc., to locate geometrically defined objects in the image. The geometric features in an image may be reflected in various components of the image data, including, for example, luminance (gray-scale intensity), hue (color), and/or saturation. Typically, geometric features are defined by boundaries where image data changes, e.g., where two differently colored regions abut. Geometric pattern matching techniques are often required to detect an object regardless of scaling, translation, and/or rotation of the object with respect to the template image. For further information on shape or geometric pattern matching, see "State-of-the-Art in Shape Matching" by Remco C. Veltkamp and Michiel Hagedoorn (1999), and "A Survey of Shape Analysis Techniques" by Sven Loncaric, which are both incorporated herein by reference.

An issue that arises in many pattern matching applications is that the image objects being analyzed, e.g., the template images and/or the target images, may include various symmetries, e.g., rotational symmetries, where, for example, a first object is a rotated version of a second object, or where a configuration of equivalent objects includes rotational symmetries, and/or reflection symmetries, where a first object is a reflected version of a second object. Current methods for determining such symmetries are computationally intensive and error prone, in that correlations between rotated and/or reflected versions are often difficult to distinguish.

Therefore, improved systems and methods are desired for detecting symmetries in and between image objects, e.g., discrete curves. Additionally, improved methods are desired for preparing discrete curves for comparison, e.g., for a symmetry detection process, e.g., as part of a pattern matching application.

SUMMARY OF THE INVENTION

Various embodiments of a system and method for determining symmetries of discrete curves, such as rotational symmetries and/or reflection symmetries, are presented. In one embodiment, a mapping operator may be applied to a first discrete curve, thereby generating a corresponding first mapped discrete curve, where the mapping operator operates to amplify features of the discrete curve. In one embodiment, the first aid second mapped discrete curves may also be normalized, thereby generating normalized mapped discrete curves. In one embodiment, where a normalized discrete curve comprises a sequence of N points, $D=(d_1, \ldots, d_N)$, the mapping operator may be determined based on the normalized discrete curve by calculating w such that:

$$\sum_{n=1}^{N} d_{n+k} d_n^* w_n = \delta_{kO} \quad \text{for } k = 0, \ldots, N$$

$$w_{k+1} - w_k \cong 0 \quad \text{for } k = 0, \ldots, N$$

for k=0, ..., N $$w_{k+1} - w_k \cong 0 \text{ for } k=0, \ldots, N$$

substantially holds, where $w_{N+1} = W_1$, and where $\delta_{ko}$ is the Kronecker delta.

Then, a correlation of the first mapped discrete curve with each of a plurality of rotationally shifted versions of a second mapped discrete curve may be computed, thereby generating a corresponding plurality of correlation values, where each correlation value indicates a respective degree of correlation between the first mapped discrete curve and a respective rotationally shifted version of the second mapped discrete curve, as is well known in the art. Note that as used herein, the term "correlation" refers to both equivalence and orientation. In other words, as is well known in the art, "similar" means that two objects are identical but for possible shift, scale, and rotation; "equivalent" means that two objects are identical but for possible shift and rotation, i.e., that they are in the same equivalence class, in mathematical terms; and "correlated" means that two objects are identical but for a possible shift, or, said another way, that the two objects are equivalent and oriented in the same way.

In one embodiment, the method may also include generating the second mapped discrete curve, e.g., by applying a second mapping operator to a received second discrete curve, thereby generating the second mapped discrete curve, wherein the second mapping operator operates to amplify features of the second discrete curve. For example, the second mapping operator may be computed based on the received second discrete curve, and applied to the second discrete curve to generate the second mapped discrete curve.

In a preferred embodiment, the first discrete curve and the second discrete curve comprise closed discrete curves, wherein the first discrete curve and the second discrete curve are interpreted as curves in a complex plane. Additionally, respective points of the first discrete curve and the second discrete curve are preferably ordered in a mathematically positive manner.

In a preferred embodiment, the first mapped discrete curve includes a first sequence of N points, $D_1'=(d_{11}, \ldots, d_{1N})$, and the second mapped discrete curve includes a second sequence of N points, $D_2'=(d_{21}, \ldots, d_{2N})$, and computing a correlation of the first mapped discrete curve with each of the plurality of rotationally shifted versions of the second mapped discrete curve includes computing:

$$S_k = \sum_{n=1}^{N} d_{1,n+k} d_{2,n}^*$$

for k=0, ..., N;

where each $s_k$ comprises a respective correlation value between the first mapped discrete curve and a respective rotationally shifted version of the second mapped discrete curve, and where the index k indicates the rotational shift.

Then, a minimum period of the two discrete curves may be determined based on the plurality of correlation values. The determination of the minimum period may be accomplished in a variety of ways. For example, in one embodiment, a plurality of maximum correlation values may be determined, where each of the plurality of maximum correlation values corresponds to a respective rotational shift between the discrete curves, and a relative rotational shift corresponding to successive maximum correlation values determined, where the relative rotational shift comprises the minimum period. In a similar embodiment, peak detection may be performed on the plurality of correlation values to determine two or more successive peaks, and the minimum period determined based on the determined two or more successive peaks. In one embodiment, the plurality of correlation values may be filtered prior to performing peak detection, thereby reducing peaks resulting from random effects. For example, a Savitzky-Golai filter of an order that avoids random effects may be used to filter the correlation data.

In another embodiment, determining a minimum period of the discrete curves based on the plurality of correlation values may include computing a power spectrum of the plurality of correlation values, and determining the minimum period based on the power spectrum. For example, as is well known in the art, the power spectrum may be computed via application of a Fourier transform to the data. The minimum period may be ascertained by determining a dominant peak in the power spectrum, e.g., by testing against a specified threshold.

In yet another embodiment, determining a minimum period of the discrete curves based on the plurality of correlation values may include determining two or more zero crossing points in the plurality of correlation values, and determining the minimum period based on the determined two or more zero crossing points. For example, in one embodiment, DC components from the plurality of correlation values may be removed to generate a modified set of correlation values, then one or more filters may be applied to the modified set of correlation values to generate filtered correlation values. The two or more zero crossing points may then be determined based on the filtered correlation values to estimate an underlying principal frequency of the filtered correlation values. Finally, the minimum period may be determined based on the estimated underlying principal frequency.

For example, if the two curves have a rotational symmetry, i.e., a period, of 90 degrees, then they also have a rotational symmetry or period of 180 degrees. The minimal period is thus 90 degrees Then, a mutual symmetry group of the two discrete curves may be determined based on the minimum period. In one embodiment, determining the symmetry group based on the minimum period includes dividing one rotational cycle by the minimum period, thereby generating the symmetry group. In this example, the symmetry group comprises a rotational symmetry group. For example, if the minimum period is 90 degrees, then the two curves have a mutual rotational symmetry group of four, i.e., 360/90.

Finally, the indicated mutual symmetry group may be output, e.g., to a file, display device, process, such as a pattern matching process, an external system, etc.

Note that in some embodiments, the first and second discrete curves may be normalized at one or more stages of the process. For example, in one embodiment, the first discrete curve may be normalized prior to applying the mapping operator to the first discrete curve. Similarly, in one embodiment, the second discrete curve may be normalized prior to applying the second mapping operator to the second discrete curve. Similarly, in one embodiment, the first and second mapped discrete curves may be normalized prior to computing the correlation of the first mapped discrete curve with each of the plurality of rotationally shifted versions of the second mapped discrete curve. More generally, in various embodiments, various preprocessing steps may be applied to the first and second discrete curves prior to, or during, the determination of the mutual symmetry group for the two discrete curves, as described below.

According to various embodiments of the method described above, the determined symmetry group may be a rotational symmetry group or a reflection symmetry group. For example, in one embodiment, the second mapped discrete curve is a reflected version or image of a third mapped discrete curve, where, for example, the third mapped discrete curve is generated by applying a respective mapping operator to a received second discrete curve. In this case, the determined mutual symmetry group is a mutual reflection symmetry group of the first discrete curve and the second discrete curve.

Thus, in one embodiment, the method may include generating the second mapped discrete curve by applying a second mapping operator to the receive second discrete curve, thereby generating the third mapped discrete curve, and reflecting the third mapped discrete curve about a specified axis of reflection, thereby generating the second mapped discrete curve. generating the second mapped discrete curve by reflecting each point in the third mapped discrete curve about the specified axis, thereby generating respective points in the second mapped discrete curve. In one embodiment, reflecting each point in the third mapped discrete curve about the specified axis includes shifting and rotating a coordinate system in the complex plane such that the specified axis of rotation comprises a positive vertical axis through an origin of the complex plane, determining corresponding positions for each point in the third mapped discrete curve based on the shifted and rotated coordinate system, thereby generating corresponding transformed points, and computing a complex conjugate for of the transformed points, thereby generating corresponding reflected points, where the reflected points comprise the second mapped discrete curve.

Note that if the second mapped discrete curve is not a reflected version or image, then the determined symmetry group is a rotational symmetry group.

In an embodiment where the second mapped discrete curve comprises a reflected version of a third mapped discrete curve about a specified axis of reflection, determining the symmetry group based on the minimum period may include dividing one rotational cycle by the minimum period, thereby generating the symmetry group, wherein the symmetry group comprises a reflection symmetry group. Furthermore, in one embodiment, the method may include determining zero or more axes of reflection based on the specified axis of reflection and the minimum period.

For example, in one embodiment, determining zero or more axes of reflection based on the specified axis of reflection and the minimum period may include determining a rotational shift between an initial orientation of the second mapped discrete curve and an orientation associated with a first correlation value peak, where the determined rotational shift indicates a reflection axis offset, e.g., equal to half the rotational shift. An initial axis of reflection may be determined based on the specified axis of reflection and the reflection axis offset, and zero or more additional axes of reflection determined based on the initial axis of reflection and the minimum period.

In one embodiment, the specified axis has a first orientation angle, and determining the initial axis of reflection based on the specified axis of reflection and the reflection axis offset includes computing an orientation of the initial axis of reflection by adding the reflection axis offset to the first orientation angle. In this case, determining the zero or more additional axes of reflection based on the initial axis of reflection and the minimum period includes computing a respective zero or more orientations of the zero or more additional axes of reflection by adding successive multiples of the minimum period to the orientation of the initial axis. In other words, once the initial axis of reflection is determined using the reflection axis offset, any remaining axes of reflection may be determined by successively adding the minimum period until a full cycle has been covered.

For example, if the specified axis of reflection is at 30 degrees with respect to the x-axis, and the rotational shift between an initial orientation of the second mapped discrete curve and an orientation associated with a first correlation value peak is 20 degrees, then the reflection axis offset is equal to 10 degrees (20/2). Thus, the initial axis of reflection is simply 30 degrees plus the 10 degree offset, giving an orientation of 40 degrees. If the minimum period determined from the correlation values is equal to 120 degrees, then the additional axes of reflection are at 160 degrees and 280 degrees, respectively.

It should be noted that if a first discrete curve $D_1$ is equivalent to a second discrete curve $D_2$, then $D_2$ is equivalent to $D_1$. Moreover, from a purely mathematical standpoint, the property of generating maximal magnitudes of 1 in the sense of the correlation equation above is transitive, and so, classes of similar curves may be determined from a collection or set of received discrete curves.

Additionally, in some embodiments, the above techniques may be applied to a single curve to determine the curve's symmetry groups under rotation and/or reflection. For example, a mapping operator may be applied to a discrete curve, thereby generating a mapped discrete curve, where the mapping operator operates to amplify features of the discrete curve.

A correlation of the mapped discrete curve with each of a plurality of rotationally shifted versions of the mapped discrete curve may be computed, thereby generating a corresponding plurality of correlation values, where each correlation value indicates a respective degree of correlation between the mapped discrete curve and a respective rotationally shifted version of the mapped discrete curve, as is well known in the art. As noted above, the term "correlation" refers to both equivalence and orientation, i.e., a high correlation value indicates that the two objects are equivalent and oriented in the same way.

As described above, in one embodiment, the rotated versions of the discrete curve may also be reflected. In other words, prior to computing the correlation values, the mapped discrete curve may be reflected about a specified axis, as described above, and the correlation values computed between the mapped discrete curve and the reflected version of the mapped discrete curve. In another embodiment, the discrete curve may be reflected prior to application of the mapping operator, where, for example, the mapping operator is applied as part of the correlation computation.

A minimum period of the discrete curve may be determined based on the plurality of correlation values, as described above in detail. Then, a symmetry group of the discrete curve may be determined based on the minimum period. As described above, the determination of the minimum period may be accomplished in a variety of ways, including, for example, determining a relative rotational shift corresponding to successive maximum correlation values, two or more successive peaks, via computation of a power spectrum of the plurality of correlation values, and/or by determination of zero crossing points, among others. As also described above, the symmetry group of the discrete curve may be a rotational symmetry group, or a reflection symmetry group, depending on whether the discrete curve was reflected prior to the correlation computation. As also noted above, in other embodiments, both approaches may be performed, resulting in a rotational symmetry group and a reflection symmetry group for the discrete curve. Finally, the indicated symmetry group may be output, e.g., to a file, display device, process, such as a pattern matching process, an external system, and so forth.

It should be further noted that the symmetry groups described above relate only to geometrical properties of the discrete curves (objects), and that in some applications, additional data may be associated with the discrete curves that may also come into play regarding object symmetries, such as, for example, color or gray scale information. For example, in a pattern matching application where an image is analyzed for symmetry, it may be the case that the above methods indicate that a first object in the scene is mutually symmetric (e.g., rotational or reflection) with respect to a second object (in a geometrical sense) in the scene. However, if the first object is blue and the second object is red, then clearly, no amount of rotation or reflection will make the objects equivalent with the same orientation. Thus, in some embodiments, the above determined symmetries may be considered to be necessary, but not sufficient, conditions for more general "image symmetries" or "object symmetries", where further information besides geometrical data is used.

The techniques described herein are broadly applicable to any domains or fields of use where data sets, such as images or any other type of data, are compared and characterized with respect to symmetry. For example, applications contemplated include, but are not limited to, image processing, data mining, machine vision, e.g., related to robotics, automated manufacturing and quality control, etc., data analysis, and optical character recognition (OCR), among others.

Thus, in various embodiments, the method operates to detect symmetries in and/or among discrete curves, e.g., representing image objects.

BRIEF DESCRIPTION OF THE DRAWINGS

A better understanding of the present invention can be obtained when the following detailed description of the preferred embodiment is considered in conjunction with the following drawings, in which.

Figure 1:
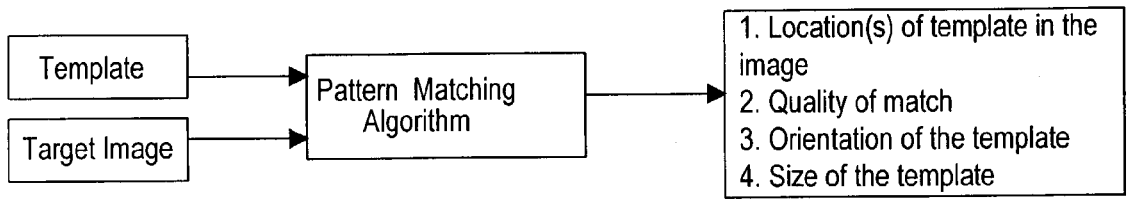
FIG. 1 illustrates pattern matching as performed in prior art.
Figure 2:
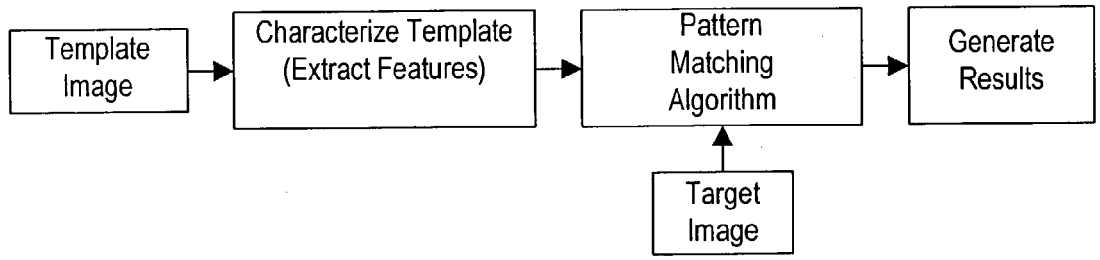
FIG. 2 illustrates pattern matching performed in prior art, which includes characterization of the template image with fewer pixels for reduced computation.

While the invention is susceptible to various modifications and alternative forms specific embodiments are shown by way of example in the drawings and are herein described in detail. It should be understood, however, that drawings and detailed description thereto are not intended to limit the invention to the particular form disclosed. But on the contrary the invention is to cover all modifications, equivalents and alternatives falling within the spirit and scope of the present invention as defined by the appended claims.

DETAILED DESCRIPTION OF THE EMBODIMENTS

Incorporation by Reference

The following patent applications are hereby incorporated by reference in their entirety as though fully and completely set forth herein:

U.S. patent application Ser. No. 10/263,560 titled "Pattern Matching System Utilizing Discrete Curve Matching with a Mapping Operator", filed Oct. 3, 2002.

U.S. patent application Ser. No. 10/454,940 titled "Rotational Symmetry Detection for Configurations of Discrete Curves", filed Jun. 2, 2003.

The following publications are hereby incorporated by reference in their entirety as though fully and completely set forth herein:

The National Instruments IMAQ™ IMAQ Vision Concepts Manual; and

"Efficient Matching Of Discrete Curves", by Lothar Wenzel, National Instruments, Austin, Tex.

Terms

The following is a glossary of terms used in the present application:

Discrete Curve—a sequence of points that defines a simple, i.e., non-self-intersecting, curve, edge, or boundary in an image or other data. A discrete curve may be 2-dimensional, 3-dimensional, or of higher dimensionality, and may be open or closed (e.g., forming a loop). A discrete curve may be generated by performing edge or boundary detection on an image or other data set, and may be normalized with respect to number of points, distribution of points, energy, average position, and/or length of the discrete curve.

Mapping Operator—an operator that may be applied to a discrete curve, i.e., to the points in a discrete curve, to amplify or magnify features of the discrete curve, e.g., to facilitate rotational symmetry detection, pattern matching, and/or other geometric analyses.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—a program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Figure 3:
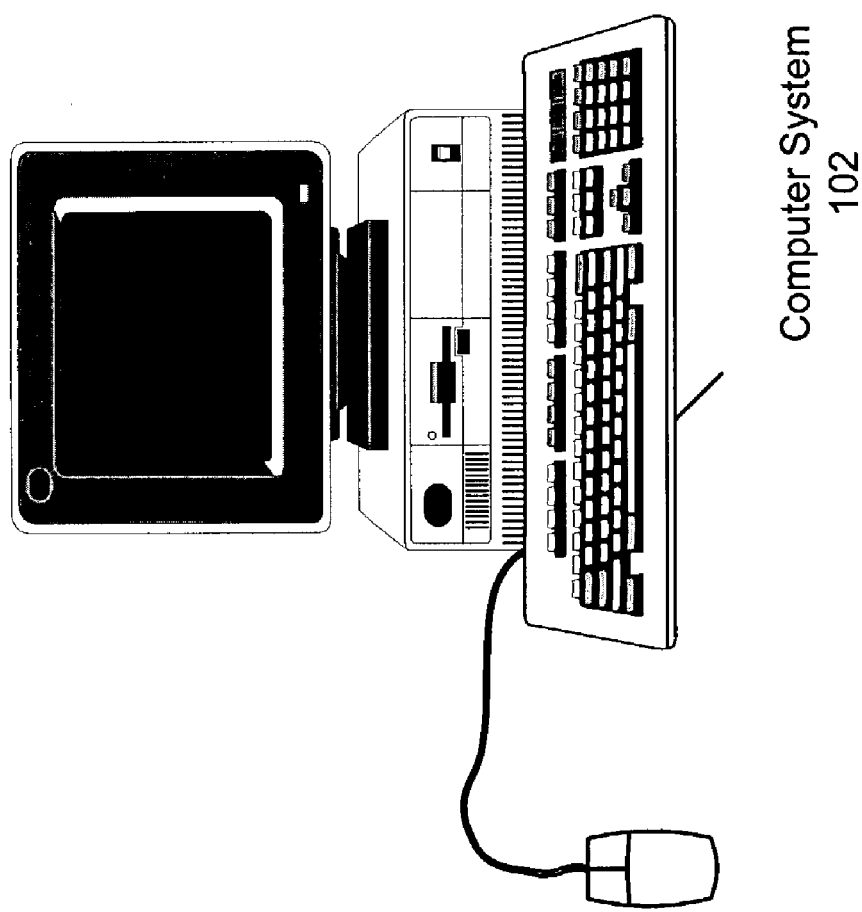
FIG. 3 illustrates a computer system suitable for performing pattern matching according to one embodiment of the present invention.

FIG. 3—Computer System

FIG. 3 illustrates a computer system 102 which may perform symmetry detection according to one embodiment of the present invention. The computer system 102 may comprise one or more processors, a memory medium, display, and an input device or mechanism, such as a keyboard or mouse, and any other components necessary for a computer system.

The computer system 102 may perform symmetry detection as part of a pattern characterization analysis of a template image and may use information determined in this analysis to determine whether a target image matches the template image and/or to locate regions of the target image which match the template image, with respect to pattern information. Images that are to be matched are preferably stored in the computer memory and/or received by the computer from an external device.

The computer system 102 preferably includes one or more software programs operable to perform the symmetry detection. The software programs may be stored in a memory medium of the computer system 102. The term "memory medium" is intended to include various types of memory, including an installation medium, e.g., a CD-ROM, or floppy disks 104, a computer system memory such as DRAM, SRAM, EDO RAM, Rambus RAM, etc., or a non-volatile memory such as a magnetic medium, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution. Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The software program(s) may be implemented in any of various ways, including procedure-based techniques, component-based techniques, graphical programming techniques, and/or object-oriented techniques, among others. For example, the software program may be implemented using ActiveX controls, C++ objects, Java Beans, Microsoft Foundation Classes (MFC), or other technologies or methodologies, as desired. A CPU, such as the host CPU, executing code and data from the memory medium comprises a means for performing symmetry detection according to the methods or flowcharts described below.

In other embodiments, the techniques presented herein may be implemented in a medium configured to perform the described methods, such as, for example, a programmable hardware element, e.g., a Field Programmable Gate Array (FPGA).

Figure 4:
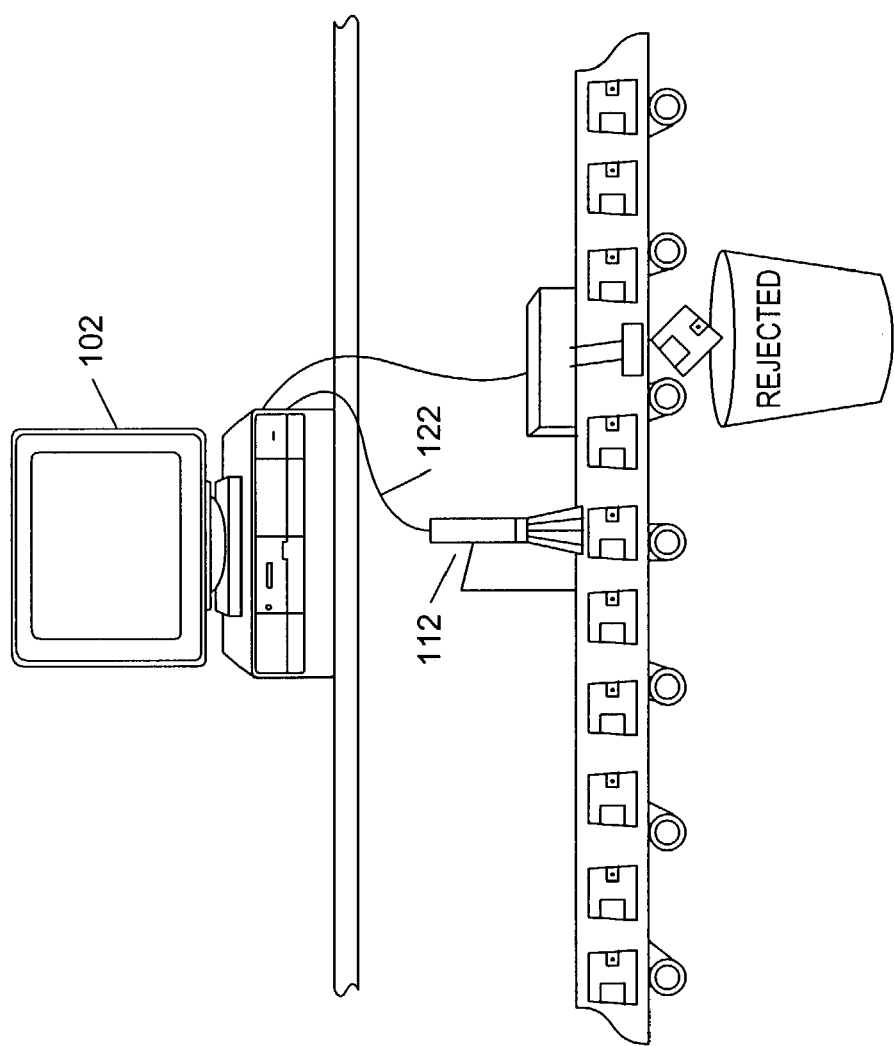
FIG. 4 illustrates an image acquisition (video capture) system for acquiring images.

FIG. 4—Machine Vision System

FIG. 4 illustrates a machine vision system or image acquisition system, which is an example of one application of the present invention. The symmetry detection techniques described herein may be used in various types of machine vision or motion control applications, for example as part of a pattern matching process. For example, the computer 102 may be embodied in various form factors and/or architectures, e.g., a robot or embedded device, among others. It is also noted that the symmetry detection techniques described herein may be performed in any of various manners, either in software, programmable logic, or hardware, or a combination thereof.

In the machine vision system of FIG. 4, computer system 102 is coupled to a camera 112 and operates to receive one or more images. The computer system 102 may be operable to perform a symmetry detection method to determine pattern information of the template image. In the present application, the term "template image" is used to refer to either an entire image, or a portion of an image, e.g., a region of interest (ROI). The computer system 102 may also be operable to perform pre-processing on the image to prepare image objects for the detection process. In one embodiment, the computer system 102 may be further operable to perform a search of a target image to locate target image regions that match the pattern information of the template image. As described below, the search may be performed to locate matching regions with any of various degrees of exactness, as appropriate for a particular application.

Figure 5:
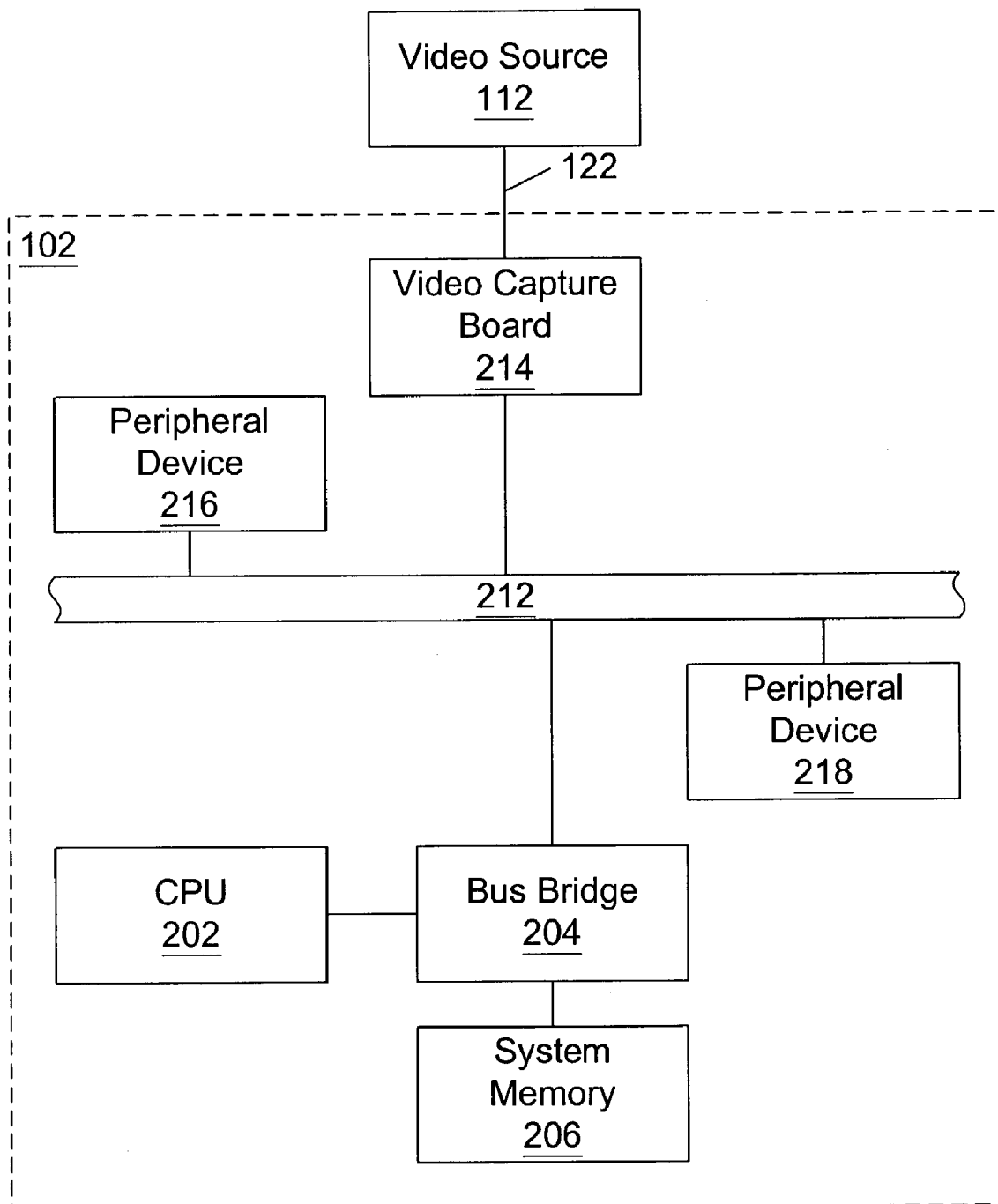
FIG. 5 is a high-level block diagram of an image acquisition system.

FIG. 5—Image Acquisition System Block Diagram

FIG. 5 is a high-level block diagram of the image acquisition system of FIG. 4 for acquiring an image for pattern matching according to one embodiment of the present invention. It is noted that the block diagram of FIG. 5 is exemplary only, and other computer system architectures may be used as desired. For example, the present invention may be implemented in a "smart camera", which integrates a sensor, analog to digital (A/D) converter, CPU, and communications devices together in a single unit. The present invention may be embodied in other architectures, devices, or embodiments, as desired.

As shown in FIG. 5, the host computer 102 preferably comprises a CPU 202, a bus bridge 204, system memory 206, and a peripheral bus 212. The CPU 202 is coupled to the bus bridge 204. The bus bridge 204 is coupled to the system memory 206 and the CPU 202, and couples to the peripheral bus 212. In the preferred embodiment, the peripheral bus 212 is the PCI expansion bus, although other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the analog or digital video signals to the video capture board 214. The video capture board 214 transfers digitized video frames to the system memory 206 through peripheral bus 212 and bus bridge 204. In this embodiment, the video capture board 214 acquires the target image and transfers it to system memory 206. One or more regions of interest (ROI) may be specified in the target image which are desired to be analyzed for symmetries. In one embodiment, the resulting symmetry information may be used as part of a pattern matching process where the ROI is searched for regions having pattern information that matches the pattern information of a template image, or the entire target image may be searched.

The system memory 206 may store a template image. The system memory 206 may also receive and/or store one or more other images, such as selected regions of interest (ROIs) in the template image or another image, or acquired target images. The system memory 206 also preferably stores software according to the present invention which operates to analyze the pattern information of the template and target images, e.g., for detection of symmetries. The system memory 206 may store the pattern information of the template image for comparison to various regions in the target image during the symmetry detection process.

The term "image," as used herein, may refer to any of various types of images. An image may be obtained from any of various sources, including a memory medium. An image may, for example, be obtained from an image file, such as a BMP, TIFF, AIPD, PNG, JPG, or GIF file, or a file formatted according to another image format. An image may also be obtained from other sources, including a hardware device, such as a camera, framegrabber, scanner, etc. An image may be a complex image, in which pixel values (positions) have a real part and an imaginary part.

It is noted that, in a symmetry detection application, the pattern information of the template image may be pre-calculated and stored in the computer, and the actual template image is then not required to be stored or used for subsequent symmetry detection determination/location operations with respective target images. Thus, when a target image is acquired, the software may compare the pattern information of the target image with the pre-computed pattern information of the template image.

The present invention is preferably implemented in one or more software programs which are executable by a processor or CPU. The software program(s) of the present invention are preferably stored in a memory medium of a computer as described above.

Although many of the embodiments described herein relate to images and image processing, it is noted that the techniques described are broadly applicable to data sets and data processing. In other words, various embodiments of the invention may be used to perform discrete curve symmetry detection, where the discrete curves are determined from data as opposed to just images.

Figure 6A:
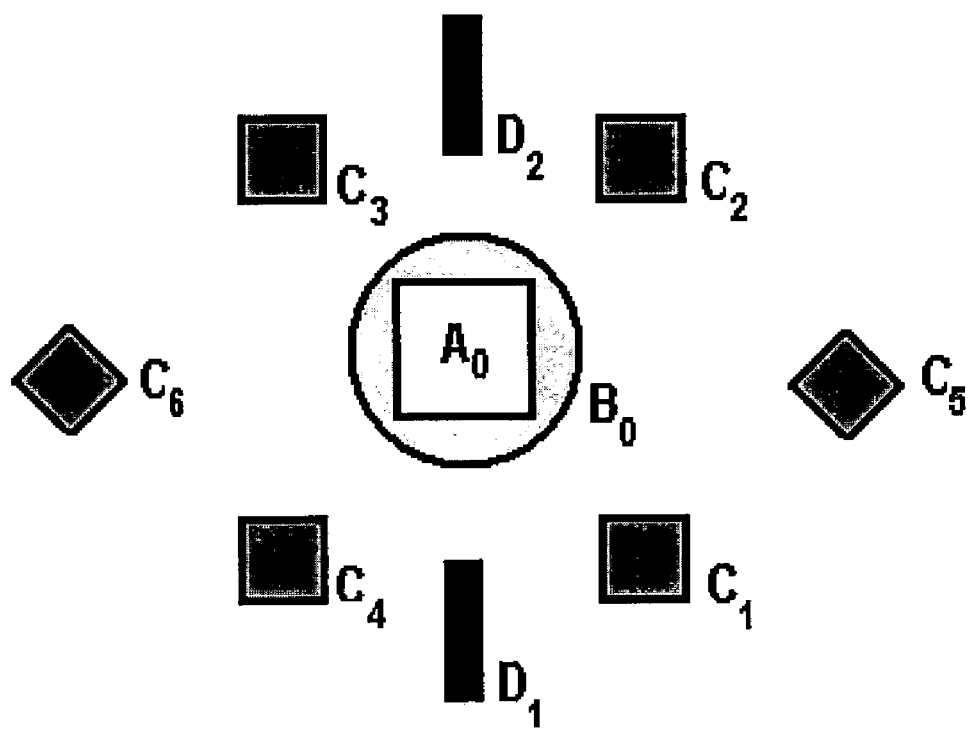
FIG. 6A illustrates example symmetry groups in a complex image.
Figure 6B:
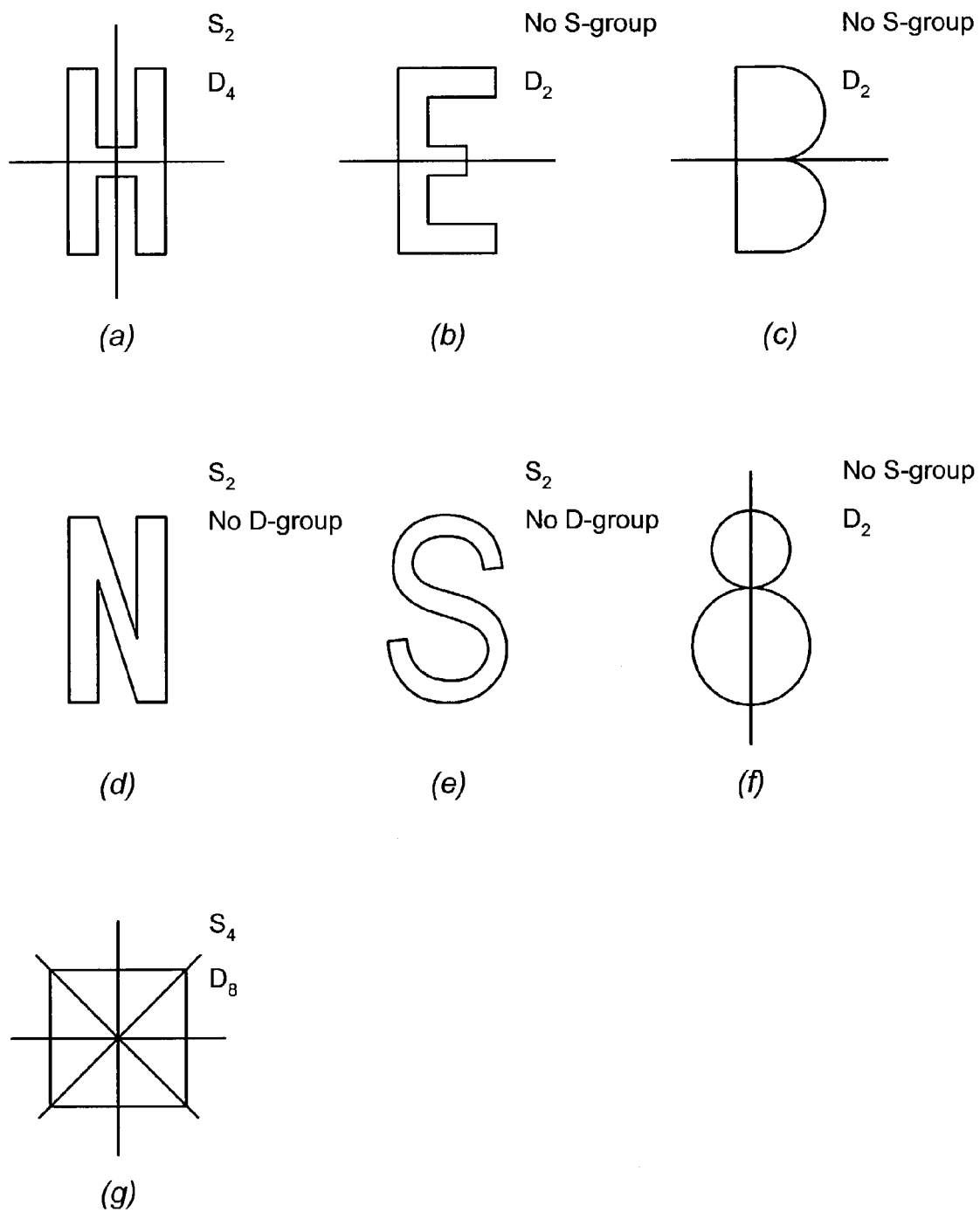
FIG. 6B illustrates examples objects and corresponding reflection and rotation symmetry groups.

FIGS. 6A and 6B—Symmetry Groups

As is well known in the art, there are two types of finite groups in the Euclidean plane: the so-called cyclic groups $S_n$ of order n and the dihedral groups $D_{2n}$ of order n. All symmetry groups must coincide with one of them. The cyclic groups $S_n$ refer to rotational symmetry groups, and the dihedral groups $D_{2n}$ refer to reflection symmetry groups.

As used herein, the term "rotational symmetry group" refers to the number of degenerate rotational positions of an object or configuration, i.e., the number of equal angle rotations that can be applied to an object or configuration about its center that result in an equivalent state. For example, as is well known in the art, a square has a rotational symmetry group of four (90 degree rotations are degenerate, i.e., 90 degree symmetry), an equilateral triangle has a rotational symmetry group of three (120 degree symmetry), and so on. Thus, a regular polygon of n sides has a rotational symmetry group generated by rotations of $2\pi/n$ radians about the center of the polygon, or equivalently, 360/n degrees. Thus, at a resolution of one degree, a circle has a rotational symmetry group of 360.

Similarly, as used herein, the term "reflection symmetry group" is related to the number of axes about which an object may be reflected with no apparent effect. Note that an object's reflection symmetry group number is actually twice the number of reflection axes for the object. Thus, an object with bi-lateral symmetry about only one axis has a reflection symmetry group of two.

FIG. 6A illustrates various example symmetry groups in a complex image or scene. As FIG. 6A shows, ten objects of various shapes and orientations are presented in a particular configuration, with circle $B_0$, center square $A_0$, peripheral squares $C_1$-$C_6$, and rectangles $D_1$ and $D_2$. It should be noted that each object has a rotational symmetry group, i.e., its individual rotation symmetry group, and that the configuration itself also has a rotational symmetry group, referred to herein as configuration rotational symmetry group. Additionally, a configuration may have configuration rotational symmetry sub-groups, each corresponding to a sub-configuration (sub-set of objects in the configuration) with that rotational symmetry, as will be described in more detail below.

Thus, in this example, the center square $A_0$ has an individual rotational symmetry group of four, the circle $B_0$ has an individual rotational symmetry group of 360 (where the rotational resolution is one degree), the peripheral squares $C_1$-$C_6$ each have an individual rotational symmetry group of four, and the rectangles $D_1$ and $D_2$ each have an individual rotational symmetry group of two.

Now, each object may also be considered to have its own "configuration rotational symmetry group", which is equal to the configuration rotational symmetry sub-group (of the configuration) to which the object belongs. For example, objects $C_1$-$C_4$ each have a configuration rotational symmetry sub-group value of 4, since that sub-configuration's rotational symmetry group is equal to each object's rotational symmetry group. However, objects $C_5$-$C_6$ each have a configuration rotational symmetry sub-group value of 2 (instead of 4), since the sub-configuration of those objects has a rotational symmetry group of 2 (180 degree symmetry).

As noted above, the rotational symmetry group of the configuration may also be considered. For example, as FIG. 6A shows, this configuration may be rotated 180 degrees ($\pi$ radians) resulting in a degenerate position, and thus, the configuration rotational symmetry group (of the configuration) is two.

Similarly, the configuration of FIG. 6A has numerous related reflection symmetries. For example, the center square $A_0$ has an individual reflection symmetry group of eight (four reflection axes), the circle $B_0$ has an individual reflection symmetry group of 720 (where the reflection axis positional resolution is one degree), the peripheral squares $C_1$-$C_6$ each have an individual reflection symmetry group of eight, and the rectangles $D_1$ and $D_2$ each have an individual reflection symmetry group of four (two axes of reflection).

Each object may also be considered to have its own "configuration reflection symmetry group", which is equal to the configuration reflection symmetry sub-group (of the configuration) to which the object belongs. For example, objects $C_1$-$C_4$ each have a configuration reflection symmetry sub-group value of eight, since that sub-configuration's reflection symmetry group is equal to each object's reflection symmetry group. However, objects $C_5$-$C_6$ each have a configuration reflection symmetry sub-group value of four (rather than eight), since sub-configuration of those objects has a reflection symmetry group of four (two axes of reflection).

As noted above, the reflection symmetry group of the configuration may also be considered. For example, as FIG. 6A shows, this configuration may be reflected along two axes, resulting in a degenerate position, and thus, the configuration reflection symmetry group (of the configuration) is four.

FIG. 6B—Examples of Objects with Various Symmetry Groups

FIG. 6B illustrates example objects with various symmetry groups. As described above, rotational symmetry groups are denoted by $S_n$, while reflection symmetry groups are denoted by $D_{2n}$, where n refers to the number of degenerate images under the particular symmetry operation for the object.

As FIG. 6B shows, each of the objects may be characterized in terms of both types of symmetry. For example, object a), a closed curve "H", is shown with two reflection axes, and thus has reflection symmetry group $D_4$. As may be clearly seen, the object also has rotational symmetry group $S_2$, since it may be rotated 180 degrees to a degenerate position.

Object b), a closed curve "E" is shown with a single reflection axis (horizontal), and thus has reflection symmetry group $D_2$. As may be clearly seen, the object has no rotational symmetry group, since no rotation results in a degenerate position. Object c), a "B" curve, is similar to object b), with reflection symmetry group $D_2$, and no rotational symmetry group. Object d), a closed "N" curve, has no reflection group, but has a rotational symmetry group $S_2$, since it may be rotated 180 degrees to a degenerate position. Object e), a closed "S" curve, has no reflection symmetry group, but as a rotational symmetry group of $S_2$, since it may be rotated 180 degrees to a degenerate position. Object f), an asymmetric script "8", has a reflection symmetry group $D_2$, since it may be reflected about a vertical axis, but has no rotational symmetry group. Object g), a square, has many reflection axes, with a reflection symmetry group of $D_8$ and a rotational symmetry group of $S_4$.

Note that if an object has two reflection axes, then the object has rotational symmetry as well, as shown in the example object a), the "H" image (two reflection axes, and 180 degree rotation symmetry).

Figure 7A:
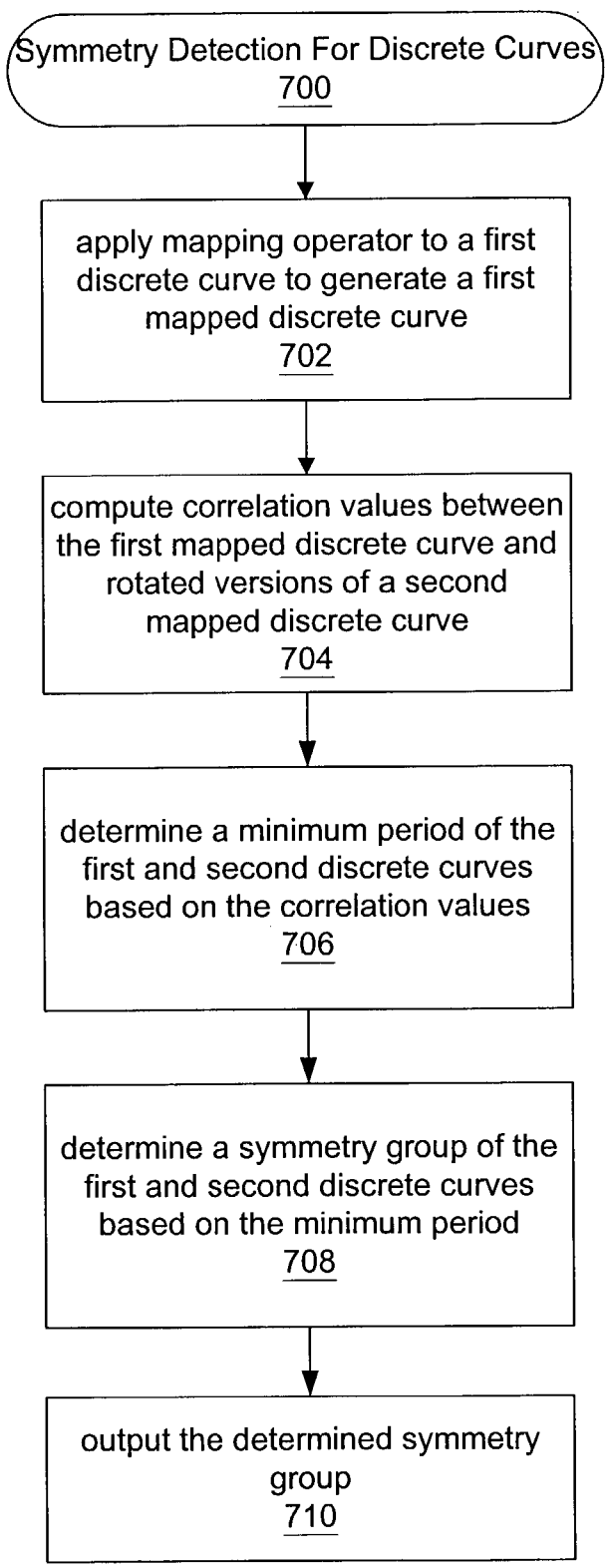
FIGS. 7A and 7B are flowchart diagrams illustrating embodiments of a method for detecting symmetries between discrete curves.
Figure 7B:
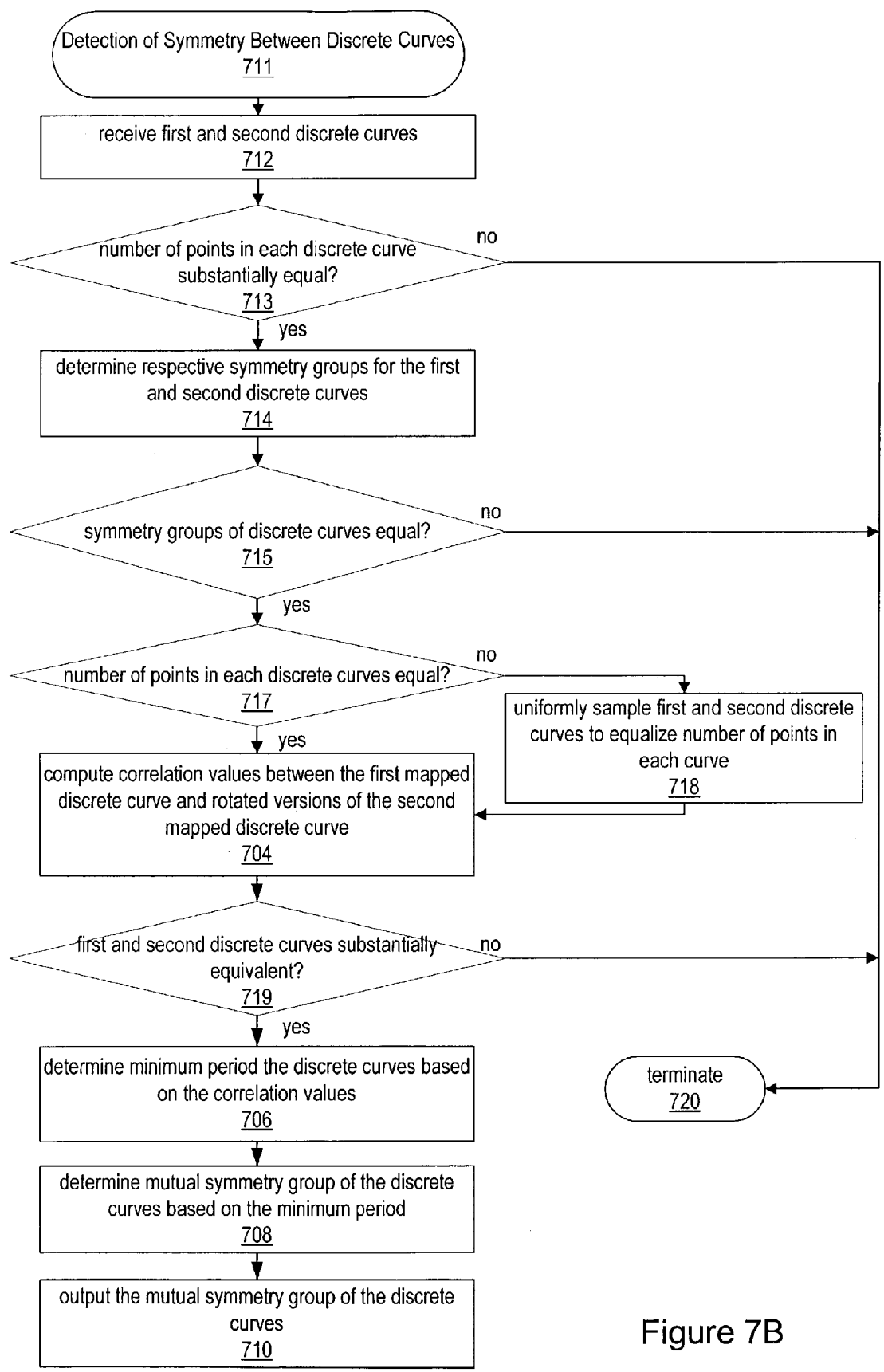

FIGS. 7A-7B—Detecting Symmetries Between Discrete Curves

FIGS. 7A and 7B flowchart embodiments of a method for determining symmetries between two discrete curves. In other words, the methods described may be used to determine mutual symmetry groups between discrete curves. The methods of FIGS. 7A and 7B may also be used for determining mutual symmetry groups (rotational and/or reflection) for a plurality of discrete curves, e.g., for pluralities of two or more discrete curves. It should be noted that in some embodiments of the methods described herein, various of the steps may be performed concurrently, in a different order than shown, or omitted. Additional steps may also be performed.

FIG. 7A is a high level flowchart of a method for determining mutual symmetry groups for two discrete curves.

As FIG. 7A shows, in one embodiment, a mapping operator may be applied to a first discrete curve, thereby generating a corresponding first mapped discrete curve, where the mapping operator operates to amplify features of the discrete curve, as indicated in 702. Further details of the form and determination of the mapping operator are provided below with reference to FIGS. 8A-8C. In one embodiment, the first and second mapped discrete curves may also be normalized, thereby generating normalized mapped discrete curves. Further details of normalizing a discrete curve are provided below with reference to FIG. 8A.

In 704, a correlation of the first mapped discrete curve with each of a plurality of rotationally shifted versions of a second mapped discrete curve may be computed, thereby generating a corresponding plurality of correlation values, where each correlation value indicates a respective degree of correlation between the first mapped discrete curve and a respective rotationally shifted version of the second mapped discrete curve, as is well known in the art. Note that as used herein, the term "correlation" refers to both equivalence and orientation. In other words, as is well known in the art, "similar" means that two objects are identical but for possible shift, scale, and rotation; "equivalent" means that two objects are identical but for possible shift and rotation, i.e., that they are in the same equivalence class, in mathematical terms; and "correlated" means that two objects are identical but for a possible shift, or, said another way, that the two objects are equivalent and oriented in the same way.

In one embodiment, the method may also include generating the second mapped discrete curve, e.g., by applying a second mapping operator to a received second discrete curve, thereby generating the second mapped discrete curve, wherein the second mapping operator operates to amplify features of the second discrete curve. For example, as described below with reference to FIGS. 8A-8C, the second mapping operator may be computed based on the received second discrete curve, and applied to the second discrete curve to generate the second mapped discrete curve.

In a preferred embodiment, the first discrete curve and the second discrete curve comprise closed discrete curves, wherein the first discrete curve and the second discrete curve are interpreted as curves in a complex plane. Additionally, respective points of the first discrete curve and the second discrete curve are preferably ordered in a mathematically positive manner.

In a preferred embodiment, the first mapped discrete curve includes a first sequence of N points, $D_1'=(d_{11}, \ldots, d_{1N})$, and the second mapped discrete curve includes a second sequence of N points, $D_2'=(d_{21}, \ldots, d_{2N})$, and computing a correlation of the first mapped discrete curve with each of the plurality of rotationally shifted versions of the second mapped discrete curve includes computing:

$$S_k = \sum_{n=1}^{N} d_{1,n+k} d_{2,n}^* \quad (1)$$

for $k=0, \ldots, N$;

where each $s_k$ comprises a respective correlation value between the first mapped discrete curve and a respective rotationally shifted version of the second mapped discrete curve, and where the index k indicates the rotational shift.

Then, a minimum period of the two discrete curves may be determined based on the plurality of correlation values, as indicated in 706. The determination of the minimum period may be accomplished in a variety of ways. For example, in one embodiment, a plurality of maximum correlation values may be determined, where each of the plurality of maximum correlation values corresponds to a respective rotational shift between the discrete curves, and a relative rotational shift corresponding to successive maximum correlation values determined, where the relative rotational shift comprises the minimum period. In a similar embodiment, peak detection may be performed on the plurality of correlation values to determine two or more successive peaks, and the minimum period determined based on the determined two or more successive peaks. In one embodiment, the plurality of correlation values may be filtered prior to performing peak detection, thereby reducing peaks resulting from random effects. For example, a Savitzky-Golai filter of an order that avoids random effects may be used to filter the correlation data.

In another embodiment, determining a minimum period of the discrete curves based on the plurality of correlation values may include computing a power spectrum of the plurality of correlation values, and determining the minimum period based on the power spectrum. For example, as is well known in the art, the power spectrum may be computed via application of a Fourier transform to the data. The minimum period may be ascertained by determining a dominant peak in the power spectrum, e.g., by testing against a specified threshold.

In yet another embodiment, determining a minimum period of the discrete curves based on the plurality of correlation values may include determining two or more zero crossing points in the plurality of correlation values, and determining the minimum period based on the determined two or more zero crossing points. For example, in one embodiment, DC components from the plurality of correlation values may be removed to generate a modified set of correlation values, then one or more filters may be applied to the modified set of correlation values to generate filtered correlation values. The two or more zero crossing points may then be determined based on the filtered correlation values to estimate an underlying principal frequency of the filtered correlation values. Finally, the minimum period may be determined based on the estimated underlying principal frequency.

For example, if the two curves have a rotational symmetry, i.e., a period, of 90 degrees, then they also have a rotational symmetry or period of 180 degrees. The minimal period is thus 90 degrees Then, in 708, a mutual symmetry group of the two discrete curves may be determined based on the minimum period. In one embodiment, determining the symmetry group based on the minimum period includes dividing one rotational cycle by the minimum period, thereby generating the symmetry group. In this example, the symmetry group comprises a rotational symmetry group. For example, if the minimum period determined in 706 is 90 degrees, then the two curves have a mutual rotational symmetry group of four, i.e., 360/90.

Finally, in 710, the indicated mutual symmetry group may be output, e.g., to a file, display device, process, such as a pattern matching process, an external system, etc.

Note that in some embodiments, the first and second discrete curves may be normalized at one or more stages of the process. For example, in one embodiment, the first discrete curve may be normalized prior to applying the mapping operator to the first discrete curve. Similarly, in one embodiment, the second discrete curve may be normalized prior to applying the second mapping operator to the second discrete curve. Similarly, in one embodiment, the first and second mapped discrete curves may be normalized prior to computing the correlation of the first mapped discrete curve with each of the plurality of rotationally shifted versions of the second mapped discrete curve. More generally, in various embodiments, any or all of the preprocessing steps described below with reference to FIG. 8A may be applied to the first and second discrete curves prior to, or during, the determination of the mutual symmetry group for the two discrete curves.

According to various embodiments of the method of FIG. 7A, the determined symmetry group may be a rotational symmetry group or a reflection symmetry group. For example, in one embodiment, the second mapped discrete curve is a reflected version or image of a third mapped discrete curve, where, for example, the third mapped discrete curve is generated by applying a respective mapping operator to a received second discrete curve. In this case, the determined mutual symmetry group is a mutual reflection symmetry group of the first discrete curve and the second discrete curve.

Thus, in one embodiment, the method may include generating the second mapped discrete curve by applying a second mapping operator to the receive second discrete curve, thereby generating the third mapped discrete curve, and reflecting the third mapped discrete curve about a specified axis of reflection, thereby generating the second mapped discrete curve. generating the second mapped discrete curve by reflecting each point in the third mapped discrete curve about the specified axis, thereby generating respective points in the second mapped discrete curve. In one embodiment, reflecting each point in the third mapped discrete curve about the specified axis includes shifting and rotating a coordinate system in the complex plane such that the specified axis of rotation comprises a positive vertical axis through an origin of the complex plane, determining corresponding positions for each point in the third mapped discrete curve based on the shifted and rotated coordinate system, thereby generating corresponding transformed points, and computing a complex conjugate for of the transformed points, thereby generating corresponding reflected points, where the reflected points comprise the second mapped discrete curve.

Note that if the second mapped discrete curve is not a reflected version or image, then the determined symmetry group is a rotational symmetry group.

In an embodiment where the second mapped discrete curve comprises a reflected version of a third mapped discrete curve about a specified axis of reflection, determining the symmetry group based on the minimum period may include dividing one rotational cycle by the minimum period, thereby generating the symmetry group, wherein the symmetry group comprises a reflection symmetry group. Furthermore, in one embodiment, the method may include determining zero or more axes of reflection based on the specified axis of reflection and the minimum period.

For example, in one embodiment, determining zero or more axes of reflection based on the specified axis of reflection and the minimum period may include determining a rotational shift between an initial orientation of the second mapped discrete curve and an orientation associated with a first correlation value peak, where the determined rotational shift indicates a reflection axis offset, e.g., equal to half the rotational shift. An initial axis of reflection may be determined based on the specified axis of reflection and the reflection axis offset, and zero or more additional axes of reflection determined based on the initial axis of reflection and the minimum period.

In one embodiment, the specified axis has a first orientation angle, and determining the initial axis of reflection based on the specified axis of reflection and the reflection axis offset includes computing an orientation of the initial axis of reflection by adding the reflection axis offset to the first orientation angle. In this case, determining the zero or more additional axes of reflection based on the initial axis of reflection and the minimum period includes computing a respective zero or more orientations of the zero or more additional axes of reflection by adding successive multiples of the minimum period to the orientation of the initial axis. In other words, once the initial axis of reflection is determined using the reflection axis offset, any remaining axes of reflection may be determined by successively adding the minimum period until a full cycle has been covered.

For example, if the specified axis of reflection is at 30 degrees with respect to the x-axis, and the rotational shift between an initial orientation of the second mapped discrete curve and an orientation associated with a first correlation value peak is 20 degrees, then the reflection axis offset is equal to 10 degrees (20/2). Thus, the initial axis of reflection is simply 30 degrees plus the 10 degree offset, giving an orientation of 40 degrees. If the minimum period determined from the correlation values is equal to 120 degrees, then the additional axes of reflection are at 160 degrees and 280 degrees, respectively.

Thus, various embodiments of the method of FIG. 7A may be used to determine rotational and/or reflection symmetries between two discrete curves.

FIG. 7B flowcharts an alternate embodiment of the method of FIG. 7A, where for efficiency, intermediate computations and comparisons are used to selectively terminate the symmetry detection process early, e.g., in the event that a non-unitary symmetry group is precluded. This type of additional processing may be particularly beneficial in so-called "real world" applications where less than ideal conditions prevail.

As FIG. 7B shows, in 712, first and second discrete curves may be received. For example, as will be described in more detail below with reference to FIG. 8A, the discrete curves may be received from any source, including, for example, from memory, from another system or process, such as an image processing system, and so forth. In one embodiment, the mutual symmetry detection process may include image processing functions and/or other pre-processing operations, as also described below. In general, the first discrete curve includes a first number of points, and the second discrete curve includes a second number of points. In a preferred embodiment, the first discrete curve and the second discrete curve comprise closed discrete curves, where the first discrete curve and the second discrete curve are interpreted as curves in a complex plane. Additionally, the respective points of the first discrete curve and the second discrete curve are preferably ordered in a mathematically positive manner. In other words, an index of the respective points in each closed curve preferably increases in a counter-clockwise fashion, as is well known to those skilled in the art.

Note that if a reflection symmetry group is to be detected, i.e., rather than a rotational symmetry group, the method may include reflecting the second discrete curve (or the first discrete curve) about a specified axis, as described above with reference to FIG. 7A.

In 713, a determination may be made as to whether the first number of points is approximately equal to the second number of points. For example, if the number of points included in the first discrete curve is equal to the number of points included in the second discrete curve within a few percent, e.g., within approximately 1 to 3 percent, then the number of points in the two curves may be considered to be approximately equal, i.e., the first number of points and the second number of points may be considered to be close in value. If the first number of points and the second number of points are determined to not be close in value, then the method may terminate, as indicated in 720.

If, in 713, the first number of points and the second number of points are determined to be close in value, then in 714, respective symmetry groups may be determined for each discrete curve. In a preferred embodiment, the respective symmetry groups may be determined in accordance with the method of FIG. 9, described below in detail, where the correlation values are determined by an auto-correlation computation for each of the first discrete curve and the second discrete curve, and the resulting respective correlation values used to determine a first symmetry group for the first discrete curve and a second symmetry group for the second discrete curve, respectively.

In a preferred embodiment, the points of the first discrete curve and the second discrete curve are substantially uniformly distributed with respect to arc-length. In other words, the points of the discrete curves are preferably uniformly spaced at substantially the same increment.

In 715, a determination may be made as to whether the determined symmetry groups for the two discrete curves are equal. If the symmetry groups are not equal, then the method may terminate, as indicated in 720.

If in 715, the symmetry groups for the two discrete curves are found to be equal, then in 717, a determination may be made as to whether the number of points in each discrete curve are equal, and if not, then in 718, the first discrete curve and the second discrete curve may be uniformly re-sampled such that the number of points in each discrete curve are equal.

In 706, a correlation of the first discrete curve with each of a plurality of rotationally shifted versions of the second discrete curve may be computed, thereby generating a corresponding plurality of correlation values, where each correlation value indicates a respective degree of correlation between the first discrete curve and a respective rotationally shifted version of the second discrete curve, as described above in 706 with reference to FIG. 7A.

It should be noted that in some embodiments, one or both of the two discrete curves may be normalized prior to computing the correlation values. For example, as described below in more detail with reference to 804 of FIG. 8A, normalizing each discrete curve may include normalizing the number of points in the discrete curve, where, for example, the number of points is proportional to arc-length (i.e., the perimeter) for the discrete curve; normalizing distribution of points in the discrete curve, e.g., a uniform distribution along the length of the curve; normalizing energy of the discrete curve, for example, by computing the center of mass of the discrete curve, and normalizing the distance from each point in the discrete curve to the center of mass such that the sum of the squares of the distances is equal to a specified value; normalizing average position of the discrete curve, e.g., such that the center of mass of the points is at the origin; and/or normalizing length of the discrete curve, e.g., where the total length of the curve is equal to one. Other normalization schemes are also contemplated. Normalizing the curves may constrain the subsequent correlation values to a particular range, e.g., to values between zero and one, which may aid in interpretation of the values.

Then, in 719, a determination may be made as to whether the first discrete curve and the second discrete curve are substantially equivalent based on the plurality of correlation values. For example, in one embodiment, the correlation values may range from zero, indicating no correlation, to one, indicating complete correlation, i.e., curve equivalence with identical orientations. Thus, the first and second discrete curves may be considered substantially equivalent if maximum correlation values approaching one are determined.

If in 719 the two discrete curves are determined not to be substantially equivalent, then the method may terminate, as indicated in 720. If, however, the two discrete curves are found to be substantially equivalent, then in 708, a minimum period of the first discrete curve with respect to the second discrete curve based on the plurality of correlation values may be determined. Said another way, if the maximal magnitude of $s_k$ calculated above is close to 1, $D_1$ and $D_2$ are substantially equivalent, and so the smallest absolute phase shift that realizes this maximum may be determined, i.e., the minimum period.

In 708, a mutual symmetry group of the first discrete curve and the second discrete curve may be determined, and where the first discrete curve and the second discrete curve are mutually symmetric under the indicated mutual symmetry group, as described above with reference to FIG. 7A. Note that depending on whether a reflection operation was performed on one of the curves, the detected mutual symmetry group may be a rotational symmetry group (no reflection operation performed) or a reflection symmetry group (reflection operation performed). It should be noted that in other embodiments, both rotational and reflection symmetry groups may be determined using the techniques described herein. In other words, correlations may be computed between the first curve and both un-reflected and reflected versions of the second curve (or vice versa).

Additionally, in some embodiments, the above techniques may be applied to a single curve to determine the curve's symmetry groups under rotation and/or reflection, as described in more detail below with reference to FIG. 9.

Finally, in 710, the determined mutual symmetry group of the first discrete curve and the second discrete curve may be output, e.g., for storage, transmission to an external system, and/or for use by another process, such as a pattern matching process, among others.

As mentioned above, in one embodiment, the techniques described above may be used to determine both rotational and reflection symmetry groups, e.g., as part of a pattern matching application. For example, in one embodiment, discrete curve matching between a first discrete curve and a second discrete curve using symmetry detection may be performed as follows:

A mutual rotational symmetry group for the first discrete curve and the second discrete curve may be determined, e.g., using an embodiment of the method of FIG. 7A (or 7B). If the mutual rotational symmetry group is greater than 1, the mutual rotational symmetry group may be output, indicating that the discrete curves are substantially equivalent under rotation. If the mutual rotational symmetry group is equal to 1, thereby indicating no mutual rotational symmetry between the discrete curves, a mutual reflection symmetry group between the first discrete curve and the second discrete curve may be determined. If the mutual reflection symmetry group is greater than 1, thereby indicating that the discrete curves are substantially equivalent under reflection, the mutual reflection symmetry group may be output. If the mutual rotational symmetry group and the mutual reflection symmetry group are both equal to 1, results indicating that the discrete curves are not substantially equivalent under rotation or reflection may be output.

In one embodiment, determining the mutual rotational symmetry group for the first discrete curve and the second discrete curve may include computing a plurality of correlation values between the first discrete curve and the second discrete curve. If a maximum correlation value of the plurality of correlation values indicates that the discrete curves are substantially equivalent, results indicating that the discrete curves are substantially equivalent may be output.

Similarly, in another embodiment, determining a mutual reflection symmetry group for the first discrete curve and the second discrete curve may include computing a plurality of correlation values between the first discrete curve and a reflected version of the second discrete curve. If a maximum correlation value of the plurality of correlation values indicates that the first discrete curve and the reflected version of the second discrete curve are substantially equivalent, results indicating that the first discrete curve and the reflected version of the second discrete curve are substantially equivalent may be output.

It should be noted that if a first discrete curve $D_1$ is equivalent to a second discrete curve $D_2$, then $D_2$ is equivalent to $D_1$. Moreover, from a purely mathematical standpoint, the property of generating maximal magnitudes of 1 in the sense of equation (1) is transitive, and so, classes of similar curves may be determined from a collection or set of received discrete curves. This aspect may be used in relation to configurations of discrete curves, as described below.

Figure 8A:
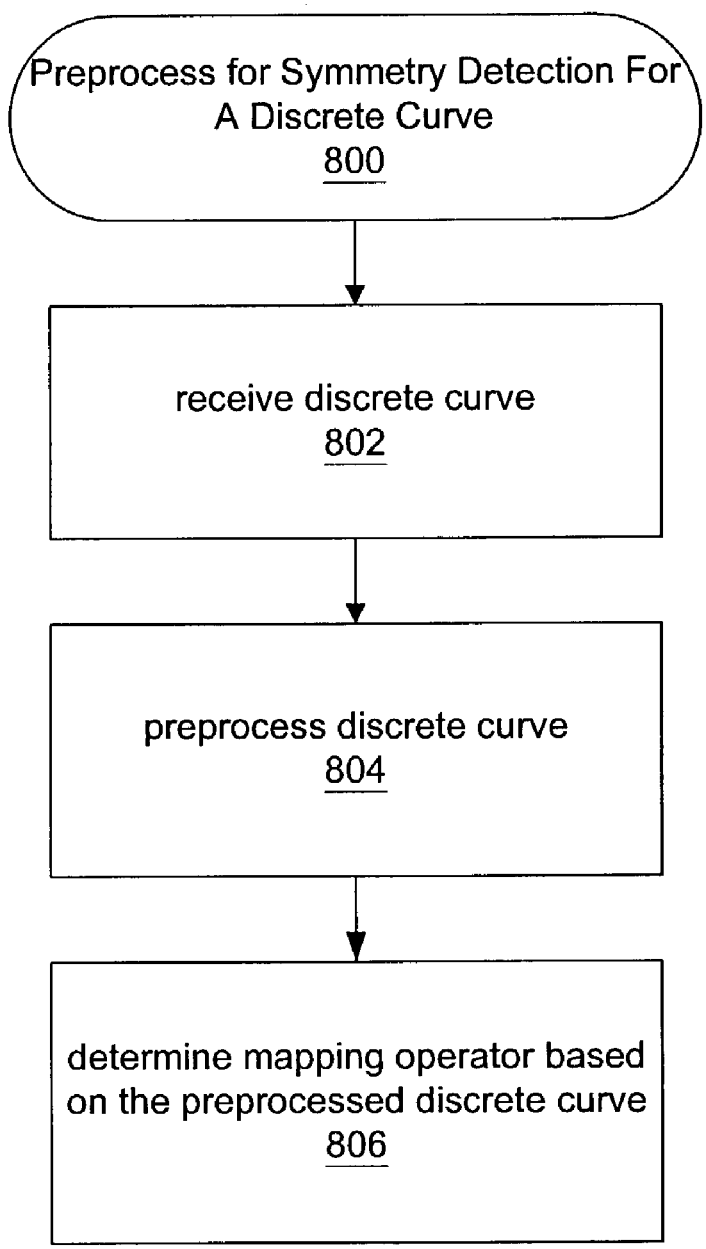
FIG. 8A flowcharts one embodiment of a method for preprocessing a discrete curve for the symmetry detection of FIGS. 7A and 7B.

FIG. 8A—Pre-Processing for Detecting Symmetry of a Discrete Curve

In some embodiments of the present invention, one or more pre-processing operations may be performed prior to, or as part of, the methods described herein, e.g., the methods of FIG. 7, FIGS. 9A-9B, and so forth. FIG. 8A flowcharts one embodiment of such pre-processing. As noted above, in some embodiments of the methods described herein, various of the steps may be performed concurrently, in a different order than shown, or omitted. Additional steps may also be performed.

In 802, the discrete curve may be received, where the discrete curve is a closed discrete curve, and where the discrete curve may be interpreted as a curve in a complex plane. In other words, each point coordinate in the curve is a complex number, and the sequence of points makes a simple closed loop.

Note that the discrete curve may be received from any source, including, for example, from memory, from another system or process, such as an image processing system, and so forth. In one embodiment, the rotational symmetry detection process may include image processing functions and/or other pre-processing operations.

For example, in one embodiment, the method may include acquiring a data set, and determining the discrete curve from the data set, where the discrete curve corresponds to a respective object in the data set. In one embodiment, the discrete curve may correspond to an object of interest in the data set. The data set may be any type of data set, although in most applications, the data set comprises image data. Determining the discrete curve from the data set may include performing edge detection, also referred to as boundary detection, on the data set to determine the discrete curve, and in some embodiments, may include applying a filter to smooth the discrete curve.

In one embodiment, the discrete curve may be preprocessed (prior to determining the mapping operator in 806 below), as indicated in 804. For example, in one embodiment, preprocessing may include normalizing the discrete curve, and computing the center of mass of the normalized discrete curve.

Discrete curves may be normalized in a variety of ways. For example, normalizing the discrete curve may include normalizing the number of points in the discrete curve, where, for example, the number of points is proportional to arc-length (i.e., the perimeter) for the discrete curve; normalizing distribution of points in the discrete curve, e.g., a uniform distribution along the length of the curve; normalizing energy of the discrete curve, for example, by computing the center of mass of the discrete curve, and normalizing the distance from each point in the discrete curve to the center of mass such that the sum of the squares of the distances is equal to a specified value; normalizing average position of the discrete curve, e.g., such that the center of mass of the points is at the origin; and/or normalizing length of the discrete curve, e.g., where the total length of the curve is equal to one. Other normalization schemes are also contemplated.

Then, in 806, the mapping operator (used above in step 704 of the method of FIG. 7A) may be determined based on the discrete curve. In an embodiment where the discrete curve is normalized (e.g., in 804 above), determining the mapping operator based on the discrete curve includes determining the mapping operator based on the normalized discrete curve. Similarly, applying the mapping operator to the discrete curve (also 704 above) may include applying the mapping operator to the normalized discrete curve.

In one embodiment, where the normalized discrete curve comprises a sequence of N points, $D=(d_1, \ldots, d_N)$, determining the mapping operator based on the normalized discrete curve may include calculating w such that:

$$\sum_{n=1}^{N} d_{n+k} d_n^* w_n = \delta_{k0} \quad \text{for } k = 0, \ldots, N \qquad (2)$$

$$w_{k+1} - w_k \cong 0 \quad \text{for } k = 0, \ldots, N$$

substantially holds, where $w_{N+1}=w_1$, and where $\delta_{ko}$ is the Kronecker delta. In other words, equation (2) may be solved for w, e.g., in a least squares manner, such that w amplifies features, e.g., distinguishing features, of the curve. This type of amplification of features may be accomplished by distorting the curve to increase the range of correlation values between curves, or between a curve and rotated versions of itself, thereby making correlations more apparent. FIGS. 8A and 8C, described below, illustrate effects of applying such a mapping operator to a discrete curve. For further information regarding the mapping operator, please see U.S. patent application Ser. No. 10/263,560 titled "Pattern Matching System Utilizing Discrete Curve Matching with a Mapping Operator", which was incorporated by reference above.

Figure 8B:
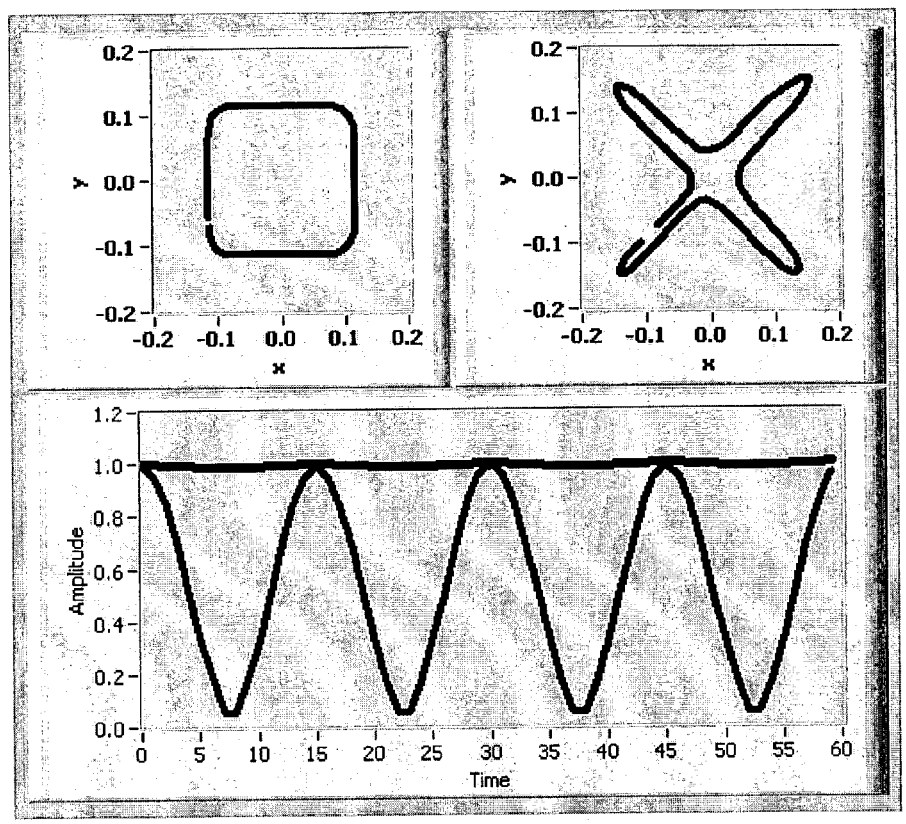
FIGS. 8B and 8C illustrate correlation effects of a mapping operator, according to one embodiment of the present invention.
Figure 8C:
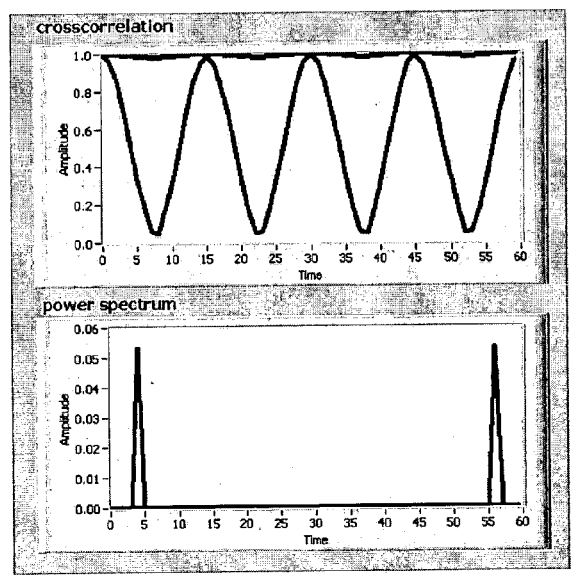

FIGS. 8B and 8C—Correlation Effect of Mapping Operator

FIGS. 8B and 8C illustrates effects of the mapping operator described above on computed correlations between discrete curves. More specifically, FIG. 8B illustrates an example closed discrete curve, a rounded square, in the top left portion of the figure. Note that a small gap has been drawn to indicate that the discrete curve, though closed, is a well defined sequence of points, i.e., has a first point and a last point.

The top right image in the FIG. 8B illustrates the discrete curve after a mapping operator, as described above, has been applied. As may be seen, the effect of the mapping operator on the curve is to amplify distinguishing features of the curve (object), and thus, the "corners" of the square have been transformed into more acute "points". This amplification or enhancement of features may make correlations of the discrete curve with itself (auto-correlation) and with other curves substantially more apparent. The bottom image of FIG. 8B illustrates auto-correlation amplitudes for the unmapped curve (the rounded square) and the mapped curve. As FIG. 8B shows, the unmapped correlation data or curve is almost horizontal, and correlation peaks for the unmapped curve are so slight as to almost be imperceptible. This low amplitude makes precise determination of the peak locations difficult and error-prone. In contrast, the correlation curve for the mapped discrete curve case has a greater amplitude, with clearly defined peaks indicating the rotational symmetry group of the curve (4). Thus, correlation data for the mapped discrete curve reveals periodicity much better than that of the unmapped discrete curve.

FIG. 8C illustrates a power spectrum (Fourier transform) of the correlation data of FIG. 8C. As FIG. 8C shows, the power spectrum of the mapped curve contains an extremely pronounced peak at t=4, indicating a principal period of 4. Other features of the curve are buried in noise. The power spectrum of the unmapped curve is very flat, and so it is difficult to identify the period. It should be noted that in both example power spectra shown, the DC components were removed beforehand, e.g., by filtering.

Thus, application of a suitable mapping operator prior to correlation computations may substantially improve results of such computations.

Figure 9:
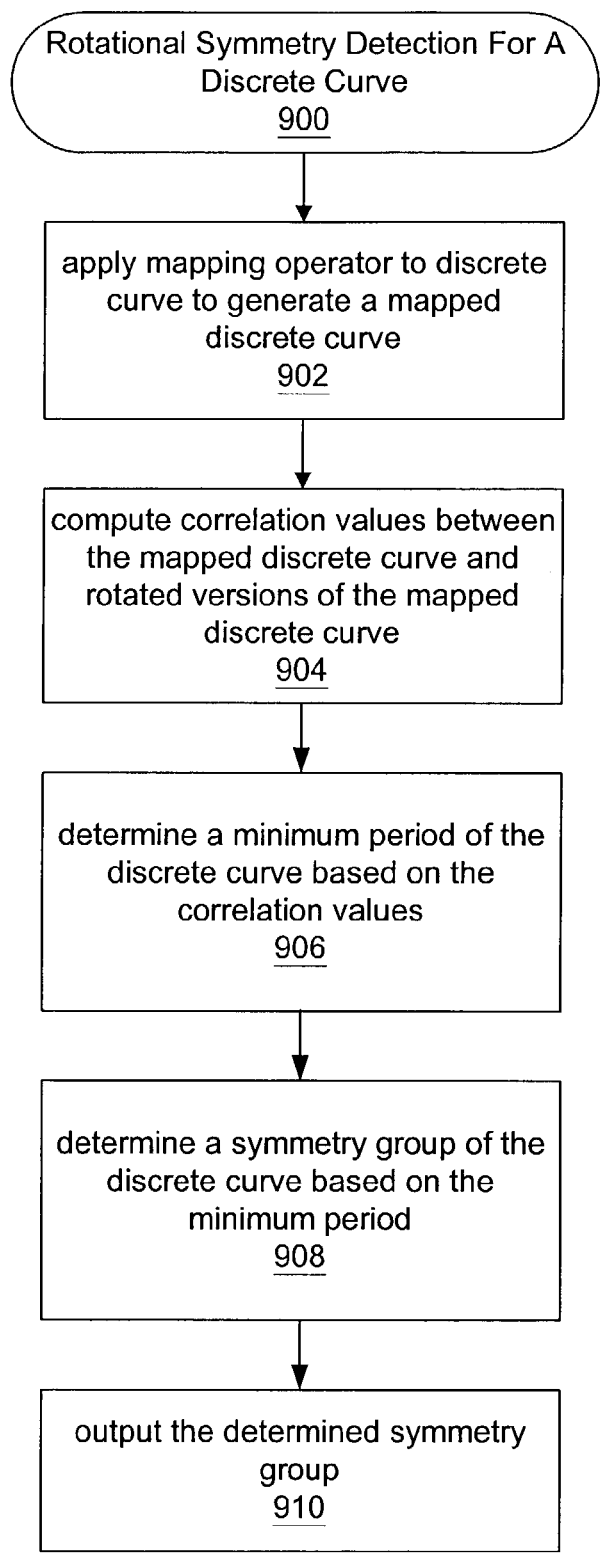
FIG. 9 is a flowchart diagram illustrating an embodiment of a method for detecting symmetries in a discrete curve.

FIG. 9—Detecting Symmetries of a Discrete Curve

The general approach described above with reference to FIGS. 7A-8C may be used in a slightly different manner to determine symmetries of a discrete curve. FIG. 9 flowcharts one embodiment of a method for detecting such symmetries in a discrete curve. It should be noted that in some embodiments of the methods described herein, various of the steps may be performed concurrently, in a different order than shown, or omitted. Additional steps may also be performed.

As FIG. 9 shows, in 902, a mapping operator may be applied to a discrete curve, thereby generating a mapped discrete curve, where the mapping operator operates to amplify features of the discrete curve. Further details of the mapping operator are provided above with reference to FIGS. 8A-8C. In one embodiment, the mapped discrete curve may also be normalized, thereby generating a normalized mapped discrete curve. Further details of normalizing the discrete curve are provided below with reference to FIG. 8A.

In 904, a correlation of the mapped discrete curve with each of a plurality of rotationally shifted versions of the mapped discrete curve may be computed, thereby generating a corresponding plurality of correlation values, where each correlation value indicates a respective degree of correlation between the mapped discrete curve and a respective rotationally shifted version of the mapped discrete curve, as is well known in the art. As noted above, the term "correlation" refers to both equivalence and orientation, i.e., a high correlation value indicates that the two objects are equivalent and oriented in the same way. For example, in a preferred embodiment, the correlations may be computed thusly:

$$S_k = \sum_{n=1}^{N} d_{n+k} d_n^* w_n \quad (3)$$

for k=0, . . . , N, where each $s_k$ comprises a respective correlation value between the mapped discrete curve and a respective rotationally shifted version of the mapped discrete curve, where the index k indicates the rotational shift. Note that in equation (3), the application of the mapping operator (902) is performed in the correlation operation (904). In another embodiment, the mapping operator may be applied separately, and thus, the correlation equation may not include the mapping operator explicitly.

Note that in equation (3), if $w_n$ is interpreted as the mapping operator, then, as shown, the mapping operator is applied only to one of the curves (e.g., to the original discrete curve or to the rotated version of the discrete curve). However, in an alternate interpretation, $w_n$ may be interpreted as the square of the mapping operator, where the mapping operator is applied to both the discrete curve and the rotated versions of the discrete curve. In other words, in one embodiment, the mapping operator may be the square root of $w_n$, i.e., $w_n^{1/2}$. In this case, both the discrete curve and the rotated version of the discrete curve may be mapped respectively to a mapped discrete curve and a rotated version of the mapped discrete curve, and the two mapped curves correlated. It should be noted that this alternate approach is mathematically equivalent to mapping only one of the discrete curves using $w_n$. However, in this alternate interpretation, the symmetric application of the mapping operator ($w_n^{1/2}$) may be interpreted as mapping both discrete curves into forms that enhance differences between the curves.

Note than in an embodiment where the mapped discrete curve is normalized, computing the correlation of the mapped discrete curve with a plurality of rotationally shifted versions of the mapped discrete curve preferably includes computing the correlation of the normalized mapped discrete curve with a plurality of rotationally shifted versions of the normalized mapped discrete curve.

It should be noted that in equation (3), the computation of the correlation values and the application of the mapping operator are performed as part of a single calculation, and so in one embodiment, the operations of 904 and 906 may be combined into a single operation. In another embodiment, the mapping operator may be applied to the curve or curves as a separate step, in which case the mapping operator may not explicitly appear in equation (3).

As described above with reference to FIGS. 7A and 7B, in one embodiment, the rotated versions of the discrete curve may also be reflected. In other words, prior to computing the correlation values, the mapped discrete curve may be reflected about a specified axis, as described above with reference to FIG. 7A, and the correlation values computed between the mapped discrete curve and the reflected version of the mapped discrete curve. In another embodiment, the discrete curve may be reflected prior to application of the mapping operator, where, for example, the mapping operator is applied as part of the correlation computation, as represented in equation (3).

In 906, a minimum period of the discrete curve may be determined based on the plurality of correlation values, as described above in detail.

Then, a symmetry group of the discrete curve may be determined based on the minimum period, as indicated in 908. As described in detail in 708 above with reference to FIG. 7A, the determination of the minimum period may be accomplished in a variety of ways, including, for example, determining a relative rotational shift corresponding to successive maximum correlation values, two or more successive peaks, via computation of a power spectrum of the plurality of correlation values, and/or by determination of zero crossing points, among others. As also described above, the symmetry group of the discrete curve may be a rotational symmetry group, or a reflection symmetry group, depending on whether the discrete curve was reflected prior to the correlation computation of 904. As also noted above, in other embodiments, both approaches may be performed, resulting in a rotational symmetry group and a reflection symmetry group for the discrete curve Finally, in 910, the indicated symmetry group may be output, e.g., to a file, display device, process, such as a pattern matching process, an external system, and so forth.

It should be further noted that the symmetry groups described above relate only to geometrical properties of the discrete curves (objects), and that in some applications, additional data may be associated with the discrete curves that may also come into play regarding object symmetries, such as, for example, color or gray scale information. For example, in a pattern matching application where an image is analyzed for symmetry, it may be the case that the above methods indicate that a first object in the scene is mutually symmetric (e.g., rotational or reflection) with respect to a second object (in a geometrical sense) in the scene. However, if the first object is blue and the second object is red, then clearly, no amount of rotation or reflection will make the objects equivalent with the same orientation. Thus, in some embodiments, the above determined symmetries may be considered to be necessary, but not sufficient, conditions for more general "image symmetries" or "object symmetries", where further information besides geometrical data is used.

Configurations of Discrete Curves

As noted above with reference to FIG. 6A, in some applications, configurations of discrete curves may also be analyzed in terms of rotational symmetry groups. For example, assuming that each discrete curve in a configuration represents an object, e.g., an image object in an image, template, or scene, each object in the configuration has a rotational symmetry group, i.e., its individual rotation symmetry group, as may be determined by the methods described above. Additionally, the configuration itself also has a rotational symmetry group, referred to as its configuration rotational symmetry group.

The configuration rotational symmetry group of a configuration relates to a minimal phase angle through which the entire configuration may be rotated that results in a degenerate or indistinguishable state of the configuration. In other words, after the rotation, the configuration is indistinguishable from its original state. Note that this configuration-based view of rotational symmetry constrains the individual rotational symmetry group of each object in the configuration to be consonant with those of the other objects in the configuration. For example, referring back to the configuration of FIG. 6A, the configuration rotational symmetry of the entire configuration is two, in that the configuration may be rotated 180 degrees with no apparent change. Note that the individual rotational symmetry group of each object in the configuration is an integer multiple of this value the center square $A_0$ has an individual rotational symmetry group of four, the circle $B_0$ has an individual rotational symmetry group of 360 (where the rotational resolution is one degree), the peripheral squares $C_1$-$C_6$ each have an individual rotational symmetry group of four, and the rectangles $D_1$ and $D_2$ each have an individual rotational symmetry group of two. Thus, each object's rotational symmetry group accommodates or includes the configuration rotational symmetry group of the configuration taken as a whole.

Additionally, as also described above with reference to FIG. 6A, a configuration may have configuration rotational symmetry sub-groups, each corresponding to a sub-configuration (sub-set of objects in the configuration) with a common rotational symmetry. For example, in the configuration of FIG. 6A, the rectangles $D_1$ and $D_2$ comprise a configuration rotational symmetry sub-group of the configuration with value two, while the subset containing the center square $A_0$ and peripheral squares $C_1$-$C_4$ has a configuration rotational symmetry sub-group of four. It should be noted that as used herein, each configuration rotational symmetry sub-group comprises similar objects. In other words, although the rectangles $D_1$ and $D_2$ and the peripheral squares $C_5$ and $C_6$ have configuration rotational symmetry group values of two, they are considered to be in two different configuration rotational symmetry sub-groups due to the fact that the rectangles and squares are dissimilar.

Figure 10:
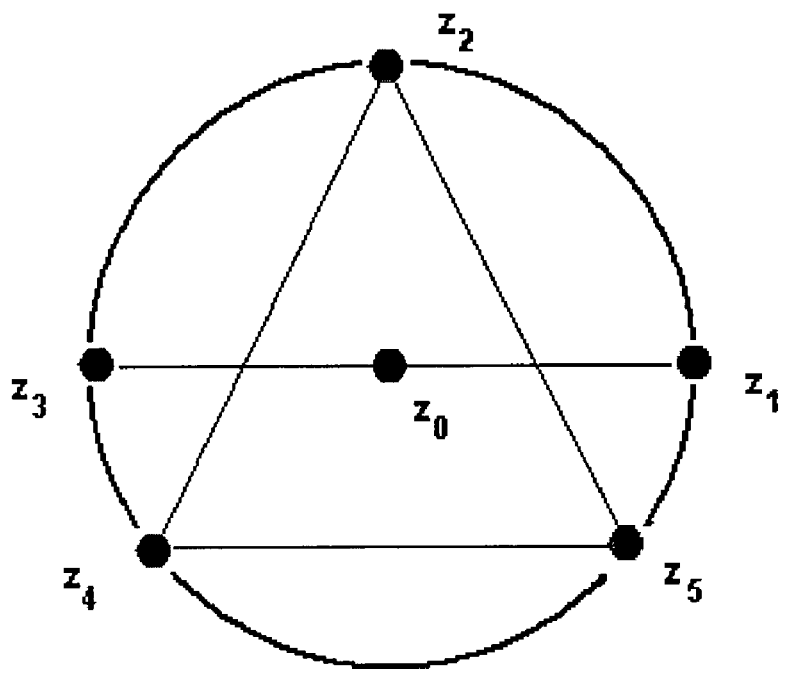
FIG. 10 illustrates example rotational symmetry groups in a configuration of equivalent objects.

FIG. 10—Configuration Rotational Symmetry Sub-Groups in a Configuration of Equivalent Objects FIG. 10 illustrates configuration rotational symmetry sub-groups in an example configuration of equivalent objects (discrete curves). More specifically, FIG. 10 illustrates configuration rotational symmetry sub-groups where all of the objects are at the same distance from the center of the configuration, denoted $Z_0$. As will be described below in more detail, in one embodiment, the configuration may be normalized such that $Z_0$ is at the origin of the complex plane, and each object's center of mass (average position) lies on a unit circle centered at $Z_0$.

As FIG. 10 shows, objects $Z_1$ and $Z_3$ comprise a first configuration rotational symmetry sub-group with value 2, since the sub-configuration of those two objects may be rotated 180 degrees with no apparent effect. In contrast, objects $Z_2$, $Z_4$, and $Z_5$ comprise a second configuration rotational symmetry sub-group with value 3, since the sub-configuration of those three objects may be rotated 120 degrees with no apparent effect (these three objects form an equilateral triangle).

Figure 11:
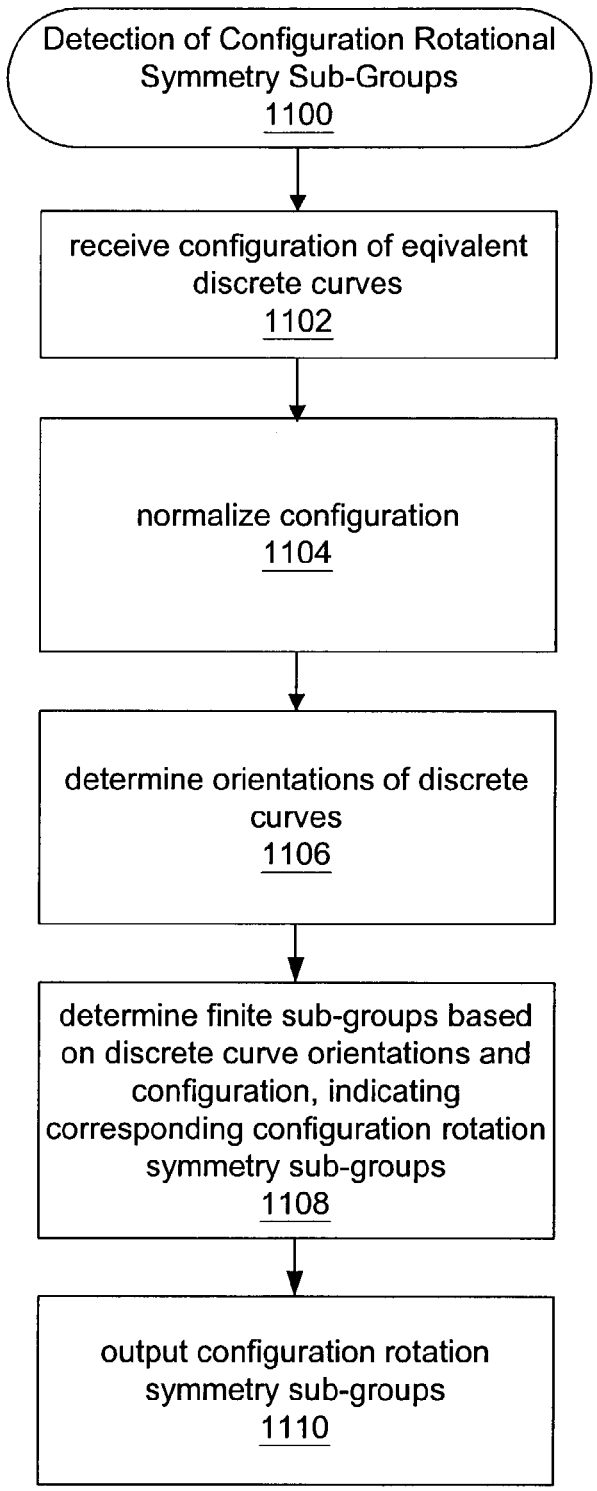
FIG. 11 is a flowchart diagram illustrating one embodiment of a method for detecting rotational symmetries in a configuration of equivalent objects.

FIG. 11—Determination of Configuration Rotational Symmetry Sub-Groups in a Configuration of Equivalent Objects FIG. 11 is a flowchart diagram illustrating one embodiment of a method for detecting rotational symmetries in a configuration of substantially equivalent objects. More specifically, the method of FIG. 11 determines configuration rotational sub-groups of a received configuration of substantially equivalent discrete curves (objects). As noted above, in various embodiments, some of the steps described may be performed concurrently, in a different order than shown, or may be omitted. Additional steps may also be performed.

As FIG. 11 indicates, in 1102, a configuration of discrete curves may be received. In a preferred embodiment, the configuration of discrete curves includes a plurality of closed discrete/curves, as described above. For example, the configuration of discrete curves may correspond to image objects in a template or received image. In one embodiment, various image processing operations may be performed on the received image to determine or extract the discrete curves, as described above in detail.

In 1104, the configuration may be normalized. In one embodiment, normalizing the configuration may include normalizing each of the plurality of discrete curves, and computing a respective discrete curve center of mass (average position) for each of the plurality of discrete curves. A configuration center of mass, i.e., a center of mass of the plurality of discrete curves, may also be computed, where distances between the configuration center of mass and each respective discrete curve center of mass are constants, and where each discrete curve center of mass comprises a respective coordinate in the complex plane. In other words, the configuration may be considered or interpreted to be in the complex plane, and so each discrete curve center of mass may have a complex coordinate in that plane. In a preferred embodiment, the configuration center of mass may be normalized to the origin.

Each discrete curve center of mass may then be normalized with respect to the configuration center of mass. In one embodiment, normalizing each discrete curve center of mass with respect to the configuration center of mass may include setting the distances between the configuration center of mass and each discrete curve center of mass to a specified value, and normalizing each discrete curve center of mass such that a first discrete curve center of mass may be located at the specified value on the positive real axis of the complex plane. For example, in a preferred embodiment, the specified value may be one, where the configuration center of mass is at the origin of the complex plane, and where each discrete curve center of mass is located on a unit circle centered at the configuration center of mass. In other words, the position of each discrete curve center of mass may be normalized so that it lies on a unit circle centered at the configuration center of mass, e.g., at the origin of the complex plane, as illustrated in the example configuration of FIG. 10. In one embodiment, the discrete curve center of masses are ordered in a mathematically positive manner with respect to the configuration center of mass and the first discrete curve center of mass, as also shown in FIG. 10.

As noted above, normalizing each discrete curve may include normalizing one or more of: number of points in the discrete curve, e.g., such that the number of points is proportional to arc-length for the discrete curve; distribution of points in the discrete curve, e.g., to a uniform distribution; energy of the discrete curve, e.g., by computing the center of mass of the discrete curve, and normalizing the distance from each point in the discrete curve to the center of mass such that the sum of the squares of the distances is equal to a specified value; average position of the discrete curve, e.g., to lie on the unit circle, as described above; and length of the discrete curve, e.g., to one. Other normalization schemes are also contemplated.

In 1106, a plurality of respective orientations between respective pairs of the discrete curves may be determined. For example, in one embodiment, the method described above with reference to FIG. 7A may be used to determine relative phase angles between each pair of (substantially) equivalent discrete curves, i.e., by determining a minimum period between each pair in the plurality of discrete curves, thereby generating the corresponding plurality of respective orientations between respective pairs of the discrete curves. As described above with reference to 706 of FIG. 7A, determining a minimum period between each pair in the plurality of discrete curves may include, for each pair: computing a plurality of correlation values between a first discrete curve in the pair and a plurality of rotationally shifted versions of a second discrete curve in the pair, where each correlation value indicates a respective degree of correlation between the first discrete curve and a respective rotationally shifted version of the second discrete curve. In a preferred embodiment, as also described above, the first discrete curve comprises a first sequence of N points, $D_1'=(d_1', \ldots, d_{1N}')$, and the second discrete curve comprises a second sequence of N points, $D_2'=(d_{21}, \ldots, d_{2N})$. Computing a correlation of the first discrete curve in the pair with each of a plurality of rotationally shifted versions of the second discrete curve in the pair preferable includes computing:

$$S_k = \sum_{n=1}^{N} d_{1,n+k} d_{2,n}^* \qquad (3)$$

for k=0, ..., N, where each $s_k$ comprises a respective correlation value between the first discrete curve and a respective rotationally shifted version of the second discrete curve. Then, a minimum period of the two discrete curves may be determined based on the plurality of correlation values, as described above in 708 with reference to FIG. 7A. As also described in detail in 708, the determination of the minimum period from the correlation values may be accomplished in a variety of ways, including, for example, determining a relative rotational shift corresponding to successive maximum correlation values, two or more successive peaks, via computation of a power spectrum of the plurality of correlation values, and/or by determination of zero crossing points, among others.

In 1108, one or more finite sub-groups, i.e., subsets, of the plurality of discrete curves may be determined based on the configuration and the plurality of respective orientations, where the one or more finite sub-groups correspond to a respective one or more rotational symmetry sub-groups of the configuration. For example, each finite sub-group may be characterized by each object or discrete curve in the sub-group having a common rotational symmetry group, and the sub-configuration of the objects or discrete curves in that sub-group having the same rotational symmetry group. In other words, the particular relative phase angles between elements in the finite sub-group coincide with the sub-configuration rotational symmetry angles. Said another way, in corresponding to a respective rotational symmetry sub-group of the configuration, the discrete curves of each finite sub-group may have relative orientations in accordance with the respective rotational symmetry sub-group.

For example, referring back to FIG. 10, objects $Z_1$ and $Z_3$ comprise a first finite sub-group. The two objects have a mutual rotational symmetry group of two, and comprise a first sub-configuration with a corresponding rotational symmetry group of two since the sub-configuration of those two objects may be rotated 180 degrees with no apparent effect, and thus the finite sub-group comprises the first configuration rotational symmetry sub-group with value two. Similarly, the objects $Z_2$, $Z_4$, and $Z_5$ form a finite subgroup where the objects have a mutual rotational symmetry group of three, and comprise a second sub-configuration with a corresponding rotational symmetry group of three since the sub-configuration of those two objects may be rotated 120 degrees with no apparent effect (these three objects form an equilateral triangle), thus comprising a second configuration rotational symmetry sub-group with value three.

In one embodiment, the method may also include removing each finite sub-group that is a subset of another finite sub-group, resulting in remaining finite sub-groups. In other words, any harmonic rotational relationships that exist between the various determined finite sub-groups may be used to remove finite sub-groups of the configuration that are, in a sense, redundant, in that the configuration rotational symmetry group of the subset finite group is included in the configuration rotational symmetry group of the superset finite group.

Finally, in 1110, the one or more rotational symmetry sub-groups of the configuration may be output, e.g., for transmission to an external system or process, to a display device, to a file, etc. In an embodiment where subset finite sub-groups are removed, leaving remaining finite sub-groups, the rotational symmetry sub-groups of the configuration that correspond to the remaining finite sub-groups may be output.

Figure 12:
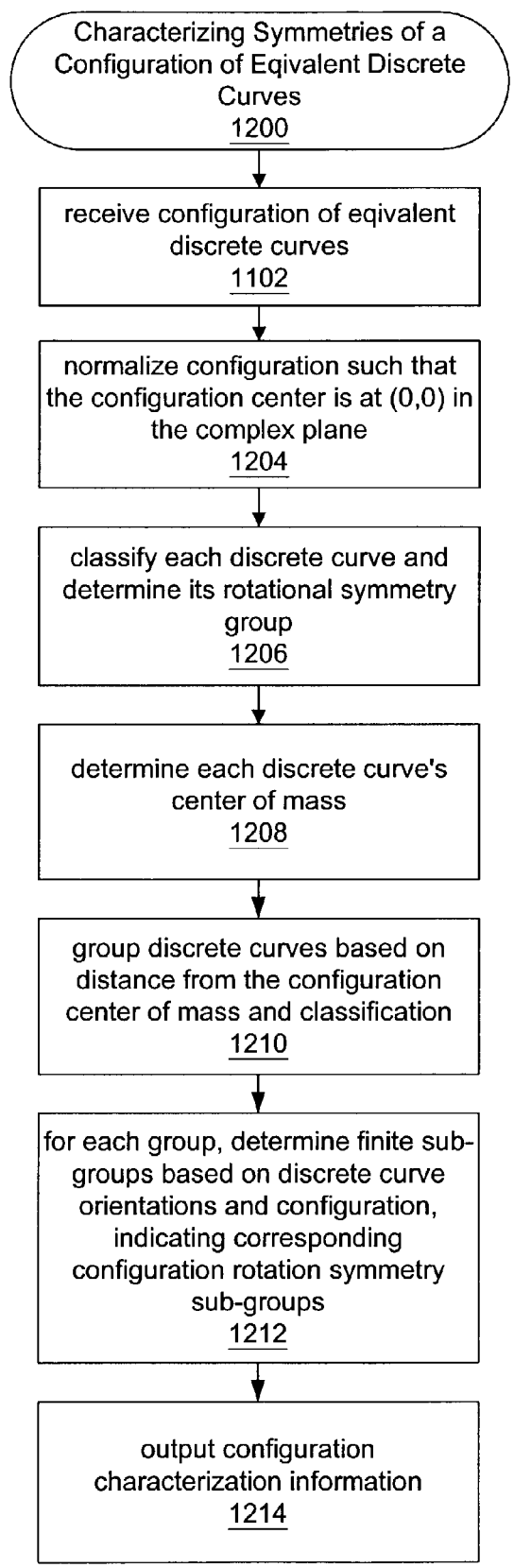
FIG. 12 is a high level flowchart diagram illustrating one embodiment of a method for detecting rotational symmetries in a configuration of equivalent objects based on the methods of FIGS. 7A, 7B, 9, and 11.

FIG. 12—Characterizing Rotational Symmetries of a Configuration of Equivalent Objects FIG. 12 is a high level flowchart of one embodiment of a method for characterizing rotational symmetries of a configuration of equivalent objects. More specifically, FIG. 12 flowcharts one embodiment of a method that combines many of the techniques presented above with reference to FIGS. 7, 9, and 11 to generate an abstract description of the configuration with respect to rotational symmetries. As noted above, in various embodiments, some of the steps described may be performed concurrently, in a different order than shown, or may be omitted. Additional steps may also be performed as desired.

As FIG. 12 shows, in 1102, a configuration of discrete curves may be received. In a preferred embodiment, the configuration of discrete curves includes a plurality of closed discrete curves, as described above.

In 1204, the configuration may be normalized, e.g., by computing a configuration center of mass, i.e., a center of mass of the plurality of discrete curves, and normalizing the configuration center of mass to a specified position. For example, in a preferred embodiment, the configuration may be interpreted as lying in the complex plane, and the configuration center of mass normalized to the origin of the complex plane.

In 1206, each discrete curve in the configuration may be classified with respect to shape, e.g., an equivalence class for each discrete curve may be determined, as described above in the methods of FIGS. 7A-7B, and its rotational symmetry group determined. For example, referring to the configuration of objects shown in FIG. 6A, the objects may be classified as squares, circles, rectangles, and so forth (or whatever classes are appropriate for the objects). In one embodiment, objects located at the center of the configuration may be classified separately from equivalent objects located elsewhere, such as the center square of FIG. 6A (class A) and the peripheral squares (class C).

In 1208, the center of mass of each discrete curve may be determined, as described above, and as is well known in the art.

In 1210, one or more subsets of the plurality of discrete curves may be determined based on each discrete curve's classification (equivalence class) and distance from the configuration center of mass, where each subset includes one or more discrete curves of the same equivalence class at a respective distance from the configuration center of mass. In one embodiment, each respective distance from the configuration center of mass may be termed a "layer" of the configuration, where the configuration center of mass defines layer 0, the nearest distance defines layer 1, and so on.

Then, in 1212, one or more configuration rotational symmetry groups may be determined for each of the one or more subsets based on each discrete curve's rotational symmetry group, and relative orientations of the discrete curves in the subset. For example, for each subset, as described above in 1108 with respect to FIG. 11, one or more finite subgroups of the plurality of discrete curves may be determined based on the configuration and the plurality of respective orientations, where the one or more finite subgroups correspond to a respective one or more rotational symmetry sub-groups of the configuration, where for example, each finite sub-group may be characterized by each object or discrete curve in the sub-group having a common rotational symmetry group, and the sub-configuration of the objects or discrete curves in that sub-group having the same rotational symmetry group.

As also described above, in one embodiment, the method may also include removing each finite sub-group that is a subset of another finite sub-group, resulting in remaining finite sub-groups.

Finally, in 1214, configuration characterization information generated in the above steps may be output, e.g., to another process, system, file, etc., as described above. For example, in one embodiment, one or more of: the determined one or more configuration rotational symmetry groups for each of the one or more subsets, the object or discrete curve classifications, the configuration layers of each object or discrete curve, and the respective rotational symmetry group for each discrete curve, among others, may be output.

Figures 13A, 13B, 15:
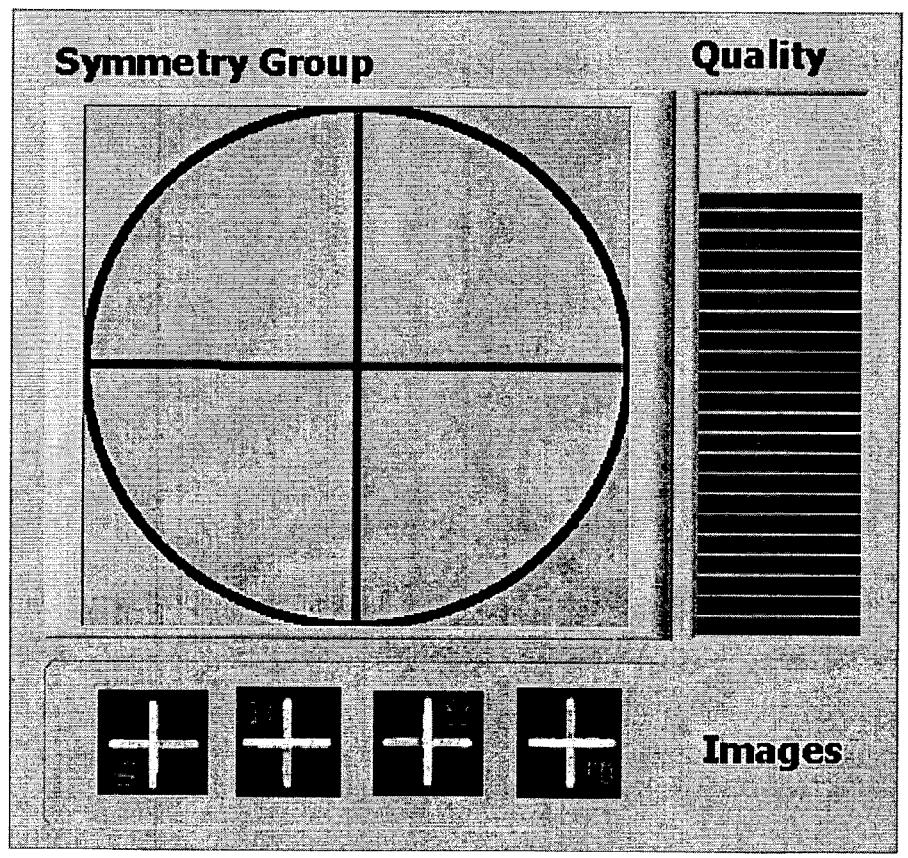
FIGS. 13A and 13B illustrate example results from the method of FIG. 12.
FIG. 15 illustrates one embodiment of a user interface for rotational symmetry detection.

FIGS. 13A and 13B, described below, present one embodiment of such configuration characterization information.

FIGS. 13A and 13B—Example Results

FIGS. 13A and 13B illustrate example results from the method of FIG. 12, according to one embodiment. More specifically, FIG. 13A provides one embodiment of an example abstract description of the configuration of FIG. 6A. Such a configuration may also be referred to as a template, e.g., an image template for an image processing application. FIG. 13B presents the determined symmetry groups of the configuration with respect to discrete curve or object classes and configuration layers.

As FIG. 13A shows, the first column (from the left of the figure) lists the various object classes of the elements of the configuration, namely, class A (center square), class B (center circle), class C (peripheral squares), and class D (rectangles). Note that in this embodiment, objects at the center of the configuration are given a separate classification than similar objects not centrally located. In other embodiments, such distinctions may be omitted, where, for example, class A may be subsumed by the more general class C. The second column lists the object symmetries of the respective object classes, where as shown, classes A and C (squares) have object symmetries of four, and class B (circle) has object symmetry of 360 (where the resolution is limited to one degree). Note that in a purely mathematical sense, class B may be considered to have a rotational symmetry group of infinity, since all rotational positions are degenerate or indistinguishable. Class D (rectangles) has an object rotational symmetry group of two. The next three columns present the various layers of the configuration and the various objects or discrete curves in those layers.

FIG. 13B presents much of the same information as FIG. 13A, but replaces the layer object populations with their corresponding configuration rotational symmetry groups, which, as explained above, may differ from their respective object rotational symmetry groups. For example, note that objects $C_5$ and $C_6$ have rotation symmetry group values of four, but configuration rotational symmetry group values of two, due to their positions in the configuration.

The type of characterization information presented in FIGS. 13A and 13B may be used to determine an underlying rotational symmetry group for the entire configuration, as described below with reference to FIG. 14.

Figure 14:
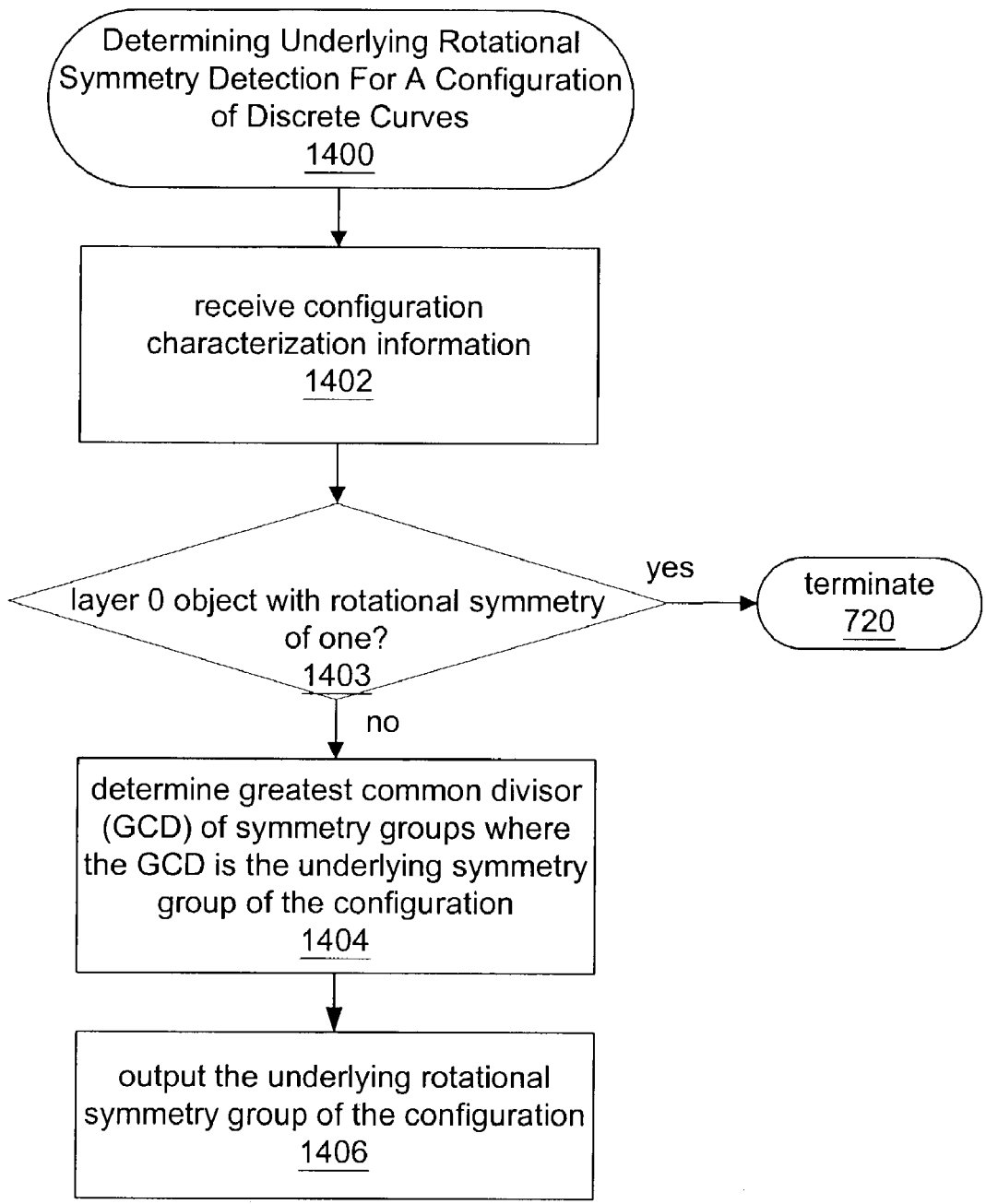
FIG. 14 flowcharts a method for determining an underlying rotational symmetry group for a configuration of discrete curves.

FIG. 14—Determining an Underlying Rotational Symmetry Group of a Configuration of Discrete Curves FIG. 14 flowcharts one embodiment of a method for determining an underlying rotational symmetry group of a configuration of discrete curves.

As noted above, in various embodiments, some of the steps described may be performed concurrently, in a different order than shown, or may be omitted. Additional steps may also be performed as desired.

In 1402, configuration characterization information may be received corresponding to a configuration of discrete curves, also referred to as objects. In one embodiment, the configuration characterization information preferably includes the configuration rotational symmetry group of each object class per layer in the configuration. In another embodiment, the configuration characterization information may also include one more of the rotational symmetry group of each object class represented in the configuration and the layers of the configuration. One example of such configuration characterization information is provided in FIG. 13B, and described above.

In one embodiment, the configuration characterization information may be determined using one or more of the techniques described above with reference to FIGS. 7A, 7B, 9, 11, and 12.

In 1404, a determination may be made as to whether an object in layer 0 of the configuration has a configuration rotational symmetry group of one. In other words, the method may determine if an object at the center of the configuration has a configuration rotational symmetry group of one, meaning that the object has no rotation symmetry, and thus that the configuration has no rotation symmetry. If a layer 0 object does have a configuration rotational symmetry group of one, then the method may terminate, as indicated in 720.

If no layer 0 object of the configuration has a configuration rotational symmetry group of one, then in 1404, a greatest common divisor (GCD) of the configuration rotational symmetry groups of the configuration, also referred to as a greatest common factor, may be determined. This value represents the underlying rotational symmetry group of the entire configuration. Note that if the GCD is equal to one, then the configuration as a whole has no rotational symmetries.

Finally, in 1406, the determined underlying rotational symmetry group of the configuration may be output, e.g., to file, to a display device, to another system or process, etc. In one embodiment, the results of the symmetry analysis may be presented in a graphical user interface, an example of which is shown in FIG. 15, and described below.

FIG. 15—A Symmetry Detection GUI

FIG. 15 illustrates one embodiment of a graphical user interface (GUI) for symmetry detection related to a received template image. Note that the embodiment shown in FIG. 15 is meant to be exemplary only, and is not intended to limit the GUI to any particular form or function.

In a preferred embodiment, the GUI provides a user interface to a program that determines the edges of the template image, e.g., the cross-like object shown, and based on the determined edges (discrete curves) a potential symmetry group of the image template is identified. In the embodiment of FIG. 15, the original template image is displayed in the lower left corner of the GUI. The three other crosses at the bottom of the GUI are rotated by 90 degrees each (in a clockwise direction).

In the example shown in FIG. 15, there are strong indicators that the symmetry group is 90 degrees, as shown in a symmetry group section of the GUI in the upper left corner of the figure, where the circle and circumscribed radial arms depict the symmetry behavior of the template image. For example, this template image has strong 90 degree rotational symmetry, represented by the four radial arms at 90 degree rotational positions. If the template image were determined to have 120 degree rotational symmetry, then there would be three radial arms in the circle, spaced 120 degrees apart.

In an ideal world all these crosses would be 100% identical. However, as may be seen, there are minor differences between them. These differences may be quantified by comparing the original template image with the rotated versions using classical normalized cross-correlation. Note that in a preferred embodiment, the cross-correlation is based on image content, and not solely on detected edges of the image. In other words, in addition to the edges of the image, information such as color or gray scale pixel data may also be used.

The correlation process may generate a plurality of numbers indicating the degree to which each pair of images matches. For example, in one embodiment, the correlation process may generate 16 real numbers that should be close to 1 (assuming at least near matches among the image pairs. Actually, in a preferred embodiment, the number of unique correlation values generated may be somewhat less. More specifically, for n objects (images), $n(n-1)/2$ correlation values may be computed. Thus, in the case of the four images of FIG. 15, a set of 6 comparisons may be generated, namely, comparing image 1 with image 2, image 3, and image 4; comparing image 2 with image 3 and image 4; and comparing image 3 with image 4. In one embodiment, these correlation values may all be displayed, or, alternatively, may be used to generate a combined quality measure, such as, for example, an average of the determined correlation values. As is well known in the art, a correlation value of 1 indicates perfect symmetry behavior, and so the smaller the number, the worse the symmetry behavior. As shown, the GUI of FIG. 15 displays this quality measure in the form of a bar graph or indicator, although other display techniques are also contemplated, e.g., numeric display, meter, etc.

In the example shown in FIG. 15, although the four images appear to be almost identical, the displayed quality indicator denotes a less than perfect match between them. This is due to various differences in the image data, such as color or gray scale pixel data, as described above. For example, in a more extreme case scenario, the template image may be a cross where all four branches have different colors. The symmetry detection process would output a nicely behaving symmetry group of four, but the quality would be very low due to the color mismatches.

Thus, in a preferred embodiment, the GUI provides a user interface for a program that generates the symmetry group of a given template and computes a quality measure representing the degree of similarity between the original template or configuration and rotated versions generated in accordance with the detected symmetry group of the configuration. Additionally, the GUI of FIG. 15 allows a user to visually inspect the similarities between the different rotated versions of the template image.

EXAMPLE APPLICATIONS

The techniques described herein are broadly applicable to any domains or fields of use where data sets, such as images or any other type of data, are compared and characterized with respect to symmetry. For example, applications contemplated include, but are not limited to, image processing, data mining, machine vision, e.g., related to robotics, automated manufacturing and quality control, etc., data analysis, and optical character recognition (OCR), among others.

It should be noted that in other embodiments, the methods described above regarding the determination of reflection symmetries of and between discrete curves may be applied to configurations of discrete curves, similar to the above described extension of rotational symmetries to configurations of discrete curves.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer accessible memory medium that stores program instructions for detecting symmetries of discrete curves, wherein the program instructions are executable by a processor to perform:
   applying a first mapping operator to a first discrete curve, thereby generating a first mapped discrete curve, wherein the mapping operator operates to amplify features of the first discrete curve;
   computing a correlation of the first mapped discrete curve with each of a plurality of rotationally shifted versions of a second mapped discrete curve, thereby generating a corresponding plurality of correlation values, wherein each correlation value indicates a respective degree of correlation between the first mapped discrete curve and a respective rotationally shifted version of the second mapped discrete curve;
   determining a minimum period of the correlation of the first and second discrete curves based on the plurality of correlation values;
   determining a symmetry group of the first and second discrete curves based on the minimum period; and
   outputting the determined symmetry group.

2. The memory medium of claim 1, wherein the program instructions are further executable to perform:
   receiving the first discrete curve, wherein the first discrete curve comprises a closed discrete curve, and wherein the first discrete curve is interpreted as a curve in a complex plane; and
   determining the mapping operator based on the first discrete curve.

3. The memory medium of claim 2, wherein the program instructions are further executable to perform:
   preprocessing the first discrete curve prior to said determining the mapping operator, wherein said preprocessing comprises:
      normalizing the first discrete curve;
      computing the center of mass of the normalized discrete curve;
   wherein said determining the mapping operator based on the first discrete curve comprises determining the mapping operator based on the normalized discrete curve; and
   wherein said applying the mapping operator to the first discrete curve comprises applying the mapping operator to the normalized discrete curve.

4. The memory medium of claim 3, wherein said normalizing comprises normalizing one or more of:
   number of points in the first discrete curve;
   distribution of points in the first discrete curve;
   energy of the first discrete curve;
   average position of the first discrete curve; and
   length of the first discrete curve.

5. The memory medium of claim 4, wherein said normalizing the number of points in the first discrete curve comprises:
   normalizing the number of points such that the number of points is proportional to arc-length for the first discrete curve.

6. The memory medium of claim 4, wherein said normalizing the energy of the first discrete curve comprises:
   computing the center of mass of the first discrete curve;
   normalizing the distance from each point in the first discrete curve to the center of mass such that the sum of the squares of the distances is equal to a specified value.

7. The memory medium of claim 3, wherein the normalized discrete curve comprises a sequence of N points, $D=(d_1, \ldots, d_N)$, and wherein said determining the mapping operator based on the normalized discrete curve comprises:
   calculating the mapping operator w such that:

$$\sum_{n=1}^{N} d_{n+k} d_n^* w_n = \delta_{k0} \quad \text{for } k = 0, \ldots, N$$

$$w_{k+1} - w_k \cong 0 \quad \text{for } k = 0, \ldots, N$$

substantially holds, wherein $w_{N-1} = w_1$, and wherein $\delta_{ko}$ is the Kronecker delta.

8. The memory medium of claim 2, wherein the program instructions are further executable to perform:
   acquiring a data set; and
   determining the first discrete curve from the data set, wherein the first discrete curve corresponds to a respective object in the data set;
   wherein the first discrete curve corresponds to an object of interest.

9. The memory medium of claim 8, wherein said determining the first discrete curve from the data set comprises:
   performing edge detection on the data set to determine the first discrete curve.

10. The memory medium of claim 9, wherein said determining the first discrete curve from the data set further comprises:
    applying a filter to smooth the first discrete curve.

11. The memory medium of claim 1, wherein the program instructions are further executable to perform:
    normalizing the mapped discrete curve, thereby generating a normalized mapped discrete curve, wherein the second mapped discrete curve comprises a second normalized mapped discrete curve, and wherein said computing the correlation of the mapped discrete curve with a plurality of rotationally shifted versions of the second mapped discrete curve comprises computing the correlation of the normalized mapped discrete curve with a plurality of rotationally shifted versions of the second normalized mapped discrete curve.

12. The memory medium of claim 1, wherein said computing a correlation of the mapped discrete curve with each of a plurality of rotationally shifted versions of the second mapped discrete curve comprises computing:

$$S_k = \sum_{n=1}^{N} d_{1,n+k} d_{2,n}^*$$

for k=0, ..., N;
wherein $d_1$ is the first mapped discrete curve, and $d_2$ is the second mapped discrete curve, and wherein each $s_k$ comprises a respective correlation value between the mapped discrete curve and a respective rotationally shifted version of the second mapped discrete curve.

13. The memory medium of claim 1, wherein said determining a minimum period of the correlation of the first and second discrete curves based on the plurality of correlation values comprises:
determining a plurality of maximum correlation values of the plurality of correlation values, wherein each of the plurality of maximum correlation values corresponds to a respective rotational shift between the first and second discrete curves; and
determining a relative rotational shift corresponding to successive maximum correlation values of the plurality of maximum correlation values;
wherein the relative rotational shift comprises the minimum period.

14. The memory medium of claim 1, wherein said determining a minimum period of the correlation of the first and second discrete curves based on the plurality of correlation values comprises:
computing a power spectrum of the plurality of correlation values; and
determining the minimum period based on the power spectrum.

15. The memory medium of claim 14, wherein said determining the minimum period based on the power spectrum comprises:
determining a dominant peak in the power spectrum by testing against a specified threshold.

16. The memory medium of claim 1, wherein said determining a minimum period of the correlation of the first and second discrete curves based on the plurality of correlation values comprises:
performing peak detection on the plurality of correlation values to determine two or more successive peaks; and
determining the minimum period based on the determined two or more successive peaks.

17. The memory medium of claim 16, wherein said determining a minimum period of the correlation of the first and second discrete curves based on the plurality of correlation values further comprises:
filtering the plurality of correlation values prior to said performing peak detection, thereby reducing peaks resulting from random effects.

18. The memory medium of claim 17, wherein said filtering comprises using a Savitzky-Golai filter of an order that avoids random effects.

19. The memory medium of claim 1, wherein said determining a minimum period of the correlation of the first and second discrete curves based on the plurality of correlation values comprises:
determining two or more zero crossing points in the plurality of correlation values; and
determining the minimum period based on the determined two or more zero crossing points.

20. The memory medium of claim 19, wherein said determining a minimum period of the correlation of the first and second discrete curves based on the plurality of correlation values further comprises:
removing DC components from the plurality of correlation values to generate a modified set of correlation values; and
applying one or more filters to the modified set of correlation values to generate filtered correlation values; and
determining the two or more zero crossing points based on the filtered correlation values to estimate an underlying principal frequency of the filtered correlation values; and
determining the minimum period based on the estimated underlying principal frequency.

21. The memory medium of claim 1,
wherein the mapping operator comprises a first mapping operator; and
wherein the program instructions are further executable to perform:
applying a second mapping operator to a second discrete curve, thereby generating the second mapped discrete curve, wherein the second mapping operator operates to amplify features of the second discrete curve;
wherein the symmetry group comprises a mutual symmetry group of the first and second discrete curves.

22. The memory medium of claim 21, wherein the program instructions are further executable to perform:
normalizing the first discrete curve prior to said applying the mapping operator to the first discrete curve; and
normalizing the second discrete curve prior to said applying the second mapping operator to the second discrete curve.

23. The memory medium of claim 21, wherein the program instructions are further executable to perform:
normalizing the first and second mapped discrete curves prior to said computing the correlation of the first mapped discrete curve with each of the plurality of rotationally shifted versions of the second mapped discrete curve.

24. The memory medium of claim 1, wherein said determining the symmetry group based on the minimum period comprises:
dividing one rotational cycle by the minimum period, thereby generating the symmetry group, wherein the symmetry group comprises a rotational symmetry group.

25. The memory medium of claim 1, wherein the first discrete curve and the second discrete curve comprise closed discrete curves, wherein the first discrete curve and the second discrete curve are interpreted as curves in a complex plane.

26. The memory medium of claim 1, wherein respective points of the first discrete curve and the second discrete curve are ordered in a mathematically positive manner.

27. The memory medium of claim 1, wherein the first mapped discrete curve comprises a first sequence of N points, $D_1'=(d_{11}, \ldots, d_{1N})$, and wherein the second mapped discrete curve comprises a second sequence of N points, $D_2'=(d_{21}, \ldots, d_{2N})$, and wherein said computing a correlation of the first mapped discrete curve with each of a plurality of rotationally shifted versions of the second mapped discrete curve comprises computing:

$$S_k = \sum_{n=1}^{N} d_{1,n+k} d_{2,n}^*$$

for k=0, . . . , N;
wherein each $s_k$ comprises a respective correlation value between the first discrete curve and a respective rotationally shifted version of the second discrete curve.

28. The memory medium of claim 1,
wherein the second mapped discrete curve comprises a reflected version of a third mapped discrete curve about a specified axis of reflection.

29. The memory medium of claim 28, wherein said determining the symmetry group based on the minimum period comprises:
dividing one rotational cycle by the minimum period, thereby generating the symmetry group, wherein the symmetry group comprises a reflection symmetry group.

30. The memory medium of claim 28, wherein the program instructions are further executable to perform:
determining one or more axes of reflection based on the specified axis of reflection and the minimum period.

31. The memory medium of claim 30, wherein said determining one or more axes of reflection based on the specified axis of reflection and the minimum period comprises:
determining a rotational shift between an initial orientation of the second mapped discrete curve and an orientation associated with a first correlation value peak, wherein the determined rotational shift indicates a reflection axis offset equal to half the rotational shift;
determining an initial axis of reflection based on the specified axis of reflection and the reflection axis offset.

32. The memory medium of claim 31,
wherein the specified axis has a first orientation angle; and
wherein said determining the initial axis of reflection based on the specified axis of reflection and the reflection axis offset comprises:
computing an orientation of the initial axis of reflection by adding the reflection axis offset to the first orientation angle.

33. The memory medium of claim 32,
wherein the specified axis has a first orientation angle such that the initial axis of reflection has an orientation equal to the reflection axis offset.

34. The memory medium of claim 28, wherein the program instructions are further executable to perform:
generating the second mapped discrete curve by reflecting each point in the third mapped discrete curve about the specified axis, thereby generating respective points in the second mapped discrete curve.

35. The memory medium of claim 34, wherein said reflecting each point in the third mapped discrete curve about the specified axis comprises:
shifting and rotating a coordinate system in the complex plane such that the specified axis of rotation comprises a positive vertical axis through an origin of the complex plane;
determining corresponding positions for each point in the third mapped discrete curve based on the shifted and rotated coordinate system, thereby generating corresponding transformed points; and
computing a complex conjugate for of the transformed points, thereby generating corresponding reflected points, wherein the reflected points comprise the second mapped discrete curve.

36. The memory medium of claim 1,
wherein the second discrete curve and the first discrete curve comprise the same discrete curve;
wherein said computing a correlation of the first mapped discrete curve with each of a plurality of rotationally shifted versions of the second mapped discrete curve comprises computing a correlation of the first mapped discrete curve with each of a plurality of rotationally shifted versions of the first mapped discrete curve; and
wherein said determining a minimum period of the correlation of the first and second discrete curves based on the plurality of correlation values comprises determining a minimum period of the correlation of the first discrete curve, wherein the minimum period indicates a symmetry group of the first discrete curve.

37. The memory medium of claim 36, wherein said determining the symmetry group based on the minimum period comprises:
dividing one rotational cycle by the minimum period, thereby generating the symmetry group, wherein the symmetry group comprises a rotational symmetry group of the first discrete curve.

38. The memory medium of claim 36,
wherein the second mapped discrete curve comprises a reflected version of the first mapped discrete curve about a specified axis of reflection; and
wherein said determining the symmetry group based on the minimum period comprises:
dividing one rotational cycle by the minimum period, thereby generating the symmetry group, wherein the symmetry group comprises a reflection symmetry group of the first discrete curve.

39. The memory medium of claim 38, wherein the program instructions are further executable to perform:
determining zero or more axes of reflection based on the specified axis of reflection and the minimum period.

40. The memory medium of claim 39, wherein said determining zero or more axes of reflection based on the specified axis of reflection and the minimum period comprises:
determining a rotational shift between an initial orientation of the second mapped discrete curve and an orientation associated with a first correlation value peak, wherein the determined rotational shift indicates a reflection axis offset equal to half the rotational shift;
determining an initial axis of reflection based on the specified axis of reflection and the reflection axis offset; and
determining zero or more additional axes of reflection based on the initial axis of reflection and the minimum period.

41. The memory medium of claim 40,
wherein the specified axis has a first orientation angle; and
wherein said determining the initial axis of reflection based on the specified axis of reflection and the reflection axis offset comprises:
computing an orientation of the initial axis of reflection by adding the reflection axis offset to the first orientation angle; and wherein said determining zero or more additional axes of reflection based on the initial axis of reflection and the minimum period comprises:
computing a respective zero or more orientations of the zero or more additional axes of reflection by adding corresponding zero or more successive multiples of the minimum period to the orientation of the initial axis.

42. A method for detecting symmetries of discrete curves, the method comprising:
applying a first mapping operator to a first discrete curve, thereby generating a first mapped discrete curve, wherein the mapping operator operates to amplify features of the first discrete curve;
computing a correlation of the first mapped discrete curve with each of a plurality of rotationally shifted versions of a second mapped discrete curve, thereby generating a corresponding plurality of correlation values, wherein each correlation value indicates a respective degree of correlation between the first mapped discrete curve and a respective rotationally shifted version of the second mapped discrete curve;
determining a minimum period of the correlation of the first and second discrete curves based on the plurality of correlation values;
determining a symmetry group of the first and second discrete curves based on the minimum period; and
outputting the determined symmetry group.

43. The method of claim 42, the method further comprising:
receiving the first discrete curve, wherein the first discrete curve comprises a closed discrete curve, and wherein the first discrete curve is interpreted as a curve in a complex plane; and
determining the mapping operator based on the first discrete curve.

44. The method of claim 43, the method further comprising:
preprocessing the first discrete curve prior to said determining the mapping operator, wherein said preprocessing comprises:
normalizing the first discrete curve;
computing the center of mass of the normalized discrete curve;
wherein said determining the mapping operator based on the first discrete curve comprises determining the mapping operator based on the normalized discrete curve; and
wherein said applying the mapping operator to the first discrete curve comprises applying the mapping operator to the normalized discrete curve.

45. The method of claim 44, wherein the normalized discrete curve comprises a sequence of N points, $D=(d_1, \ldots, d_N)$, and wherein said determining the mapping operator based on the normalized discrete curve comprises:
calculating the mapping operator w such that:

$$\sum_{n=1}^{N} d_{n+k} d_n^* w_n = \delta_{kO} \quad \text{for } k = 0, \ldots, N$$
$$w_{k+1} - w_k \cong 0 \quad \text{for } k = 0, \ldots, N$$

substantially holds, wherein $w_{N-1}=w_1$, and wherein $\delta_{ko}$ is the Kronecker delta.

46. The method of claim 42, wherein said computing a correlation of the mapped discrete curve with each of a plurality of rotationally shifted versions of the second mapped discrete curve comprises computing:

$$S_k = \sum_{n=1}^{N} d_{1,n+k} d_{2,n}^*$$

for $k=0, \ldots, N$;
wherein $d_1$ is the first mapped discrete curve, and $d_2$ is the second mapped discrete curve, and wherein each $s_k$ comprises a respective correlation value between the mapped discrete curve and a respective rotationally shifted version of the second mapped discrete curve.

47. The method of claim 42,
wherein the mapping operator comprises a first mapping operator; and
wherein the method is further configured to perform:
applying a second mapping operator to a second discrete curve, thereby generating the second mapped discrete curve, wherein the second mapping operator operates to amplify features of the second discrete curve;
wherein the symmetry group comprises a mutual symmetry group of the first and second discrete curves.

48. The method of claim 42, wherein said determining the symmetry group based on the minimum period comprises:
dividing one rotational cycle by the minimum period, thereby generating the symmetry group, wherein the symmetry group comprises a rotational symmetry group.

49. The method of claim 42,
wherein the second mapped discrete curve comprises a reflected version of a third mapped discrete curve about a specified axis of reflection; and
wherein said determining the symmetry group based on the minimum period comprises:
dividing one rotational cycle by the minimum period, thereby generating the symmetry group, wherein the symmetry group comprises a reflection symmetry group.

50. The method of claim 42,
wherein the second discrete curve and the first discrete curve comprise the same discrete curve;
wherein said computing a correlation of the first mapped discrete curve with each of a plurality of rotationally shifted versions of the second mapped discrete curve comprises computing a correlation of the first mapped discrete curve with each of a plurality of rotationally shifted versions of the first mapped discrete curve; and
wherein said determining a minimum period of the correlation of the first and second discrete curves based on the plurality of correlation values comprises determining a minimum period of the correlation of the first discrete curve, wherein the minimum period indicates a symmetry group of the first discrete curve.

51. The method of claim 50, wherein said determining the symmetry group based on the minimum period comprises:
dividing one rotational cycle by the minimum period, thereby generating the symmetry group, wherein the symmetry group comprises a rotational symmetry group of the first discrete curve.

52. The method of claim 50,
wherein the second mapped discrete curve comprises a reflected version of the first mapped discrete curve about a specified axis of reflection; and
wherein said determining the symmetry group based on the minimum period comprises:
dividing one rotational cycle by the minimum period, thereby generating the symmetry group, wherein the symmetry group comprises a reflection symmetry group of the first discrete curve.

53. A method for detecting reflection symmetries of discrete curves, the method comprising:
applying a mapping operator to a discrete curve, thereby generating a mapped discrete curve, wherein the mapping operator operates to amplify features of the discrete curve;
computing a correlation of the mapped discrete curve with each of a plurality of rotationally shifted versions of a reflected image of the mapped discrete curve, thereby generating a corresponding plurality of correlation values, wherein each correlation value indicates a respective degree of correlation between the mapped discrete curve and a respective rotationally shifted version of the reflected image of the mapped discrete curve;
determining a minimum period of the correlation based on the plurality of correlation values;
determining a reflection symmetry group of the discrete curve based on the minimum period; and
outputting the determined reflection symmetry group.

54. A computer accessible memory medium that stores program instructions for detecting rotational symmetries of discrete curves, wherein the program instructions are executable by a processor to perform:
applying a mapping operator to a discrete curve, thereby generating a mapped discrete curve, wherein the mapping operator operates to amplify features of the discrete curve;
computing a correlation of the mapped discrete curve with each of a plurality of rotationally shifted versions of the mapped discrete curve, thereby generating a corresponding plurality of correlation values, wherein each correlation value indicates a respective degree of correlation between the mapped discrete curve and a respective rotationally shifted version of the mapped discrete curve;
determining a minimum period of the correlation of the discrete curve based on the plurality of correlation values; and
determining a symmetry group of the discrete curve based on the minimum period; and
outputting the determined rotational symmetry group.

55. A computer accessible memory medium that stores program instructions for detecting reflection symmetries of a discrete curve, wherein the program instructions are executable by a processor to perform:
applying a mapping operator to a discrete curve, thereby generating a mapped discrete curve, wherein the mapping operator operates to amplify features of the discrete curve;
computing a correlation of the mapped discrete curve with each of a plurality of rotationally shifted versions of a reflected image of the mapped discrete curve, thereby generating a corresponding plurality of correlation values, wherein each correlation value indicates a respective degree of correlation between the mapped discrete curve and a respective rotationally shifted version of the reflected image of the mapped discrete curve;
determining a minimum period of the correlation of the discrete curve based on the plurality of correlation values; and
determining a reflection symmetry group of the discrete curve based on the minimum period; and
outputting the determined reflection symmetry group.

56. The memory medium of claim 32, wherein the program instructions are further executable to perform:
determining one or more additional axes of reflection based on the initial axis of reflection and the minimum period, wherein said determining one or more additional axes of reflection based on the initial axis of reflection and the minimum period comprises:
computing a respective one or more orientations of the one or more additional axes of reflection by adding successive multiples of the minimum period to the orientation of the initial axis.

57. The memory medium of claim 56,
wherein the specified axis has a first orientation angle such that the initial axis of reflection has an orientation equal to the reflection axis offset.

58. The memory medium of claim 31, wherein the program instructions are further executable to perform:
determining one or more additional axes of reflection based on the initial axis of reflection and the minimum period.

* * * * *

UNITED STATES PATENT AND TRADEMARK OFFICE
CERTIFICATE OF CORRECTION

PATENT NO. : 7,269,286 B2
APPLICATION NO. : 10/455141
DATED : September 11, 2007
INVENTOR(S) : Wenzel et al.

It is certified that error appears in the above-identified patent and that said Letters Patent is hereby corrected as shown below:

In the Claims:

Column 36
Line 38, please delete "wherein $w_{N-1} = w_1$, and wherein" and substitute -- wherein $w_{N+1} = w_1$, and wherein --.

Column 40
Line 3, please delete "conjugate or of the transformed" and substitute -- conjugate of the transformed --.

Column 41
Line 66, please delete "wherein $w_{N-1} = w_1$, and wherein" and substitute -- wherein $w_{N+1} = w_1$, and wherein --.

Signed and Sealed this

Eighteenth Day of December, 2007

JON W. DUDAS
*Director of the United States Patent and Trademark Office*